(12) United States Patent
Dyck et al.

(10) Patent No.: US 6,237,410 B1
(45) Date of Patent: May 29, 2001

(54) METHOD FOR CONTROLLING THE SPEED OF A PUMP BASED ON MEASUREMENT OF THE FLUID DEPTH IN A WELL

(75) Inventors: John G. Dyck, Calgary; James A. Baker, Edmonton; Ronald W. Halisky, Calgary, all of (CA)

(73) Assignee: Circa Enterprises Inc., Alberta (CA)

( * ) Notice: Subject to any disclaimer, the term of this patent is extended or adjusted under 35 U.S.C. 154(b) by 0 days.

(21) Appl. No.: 09/077,791

(22) PCT Filed: Oct. 6, 1997

(86) PCT No.: PCT/CA97/00734
§ 371 Date: Jun. 8, 1998
§ 102(e) Date: Jun. 8, 1998

(87) PCT Pub. No.: WO98/15801
PCT Pub. Date: Apr. 16, 1998

Related U.S. Application Data
(60) Provisional application No. 60/028,083, filed on Oct. 7, 1996.

(51) Int. Cl.[7] .............................. G01F 23/00; G01S 3/80
(52) U.S. Cl. ....................... 73/290 V; 73/291; 367/118; 367/120; 367/99
(58) Field of Search .......................... 73/290 V, 151, 73/291; 702/28; 367/99, 118, 120

(56) References Cited

U.S. PATENT DOCUMENTS 5,117,399 * 5/1992 McCoy et al. .................. 367/99
5,884,231 * 3/1999 Perdue et al. .................. 702/28

OTHER PUBLICATIONS

Pages 268–276 in Horowitz and Hill, _The Art of Electronics_, published 1989.*

* cited by examiner

Primary Examiner—Hezron Williams
Assistant Examiner—Dennis Loo
(74) Attorney, Agent, or Firm—Sughrue, Mion, Zinn, Macpeak & Seas, PLLC

(57) ABSTRACT

A method and apparatus for measuring the depth of fluid in a well and for controlling the speed of a pump which pumps fluid out of the well according to the measured depth is disclosed. The depth of fluid in a well is measured by sending an acoustic pulse into an annulus between the well casing and the production tubing and sensing reflections of the acoustic pulse from collars on the tubing and a reflection from the fluid surface. Since the collar spacing on the production tubing is known, the distance from the top of the well to the surface of the fluid can be obtained by accumulating the distance associated with the collars detected in the reflection signal. The collar reflections are sensed by converting the reflected acoustic wave into electrical signals and then amplitude demodulating the broadband electrical signals. Once the distance from the top of the well to the surface of the fluid is determined, the height of the fluid above the pump inlet can be obtained by subtracting the distance from the top of the well to the surface of the fluid from the known distance from the top of the well to the pump inlet. The speed of the pump, and therefore its pumping capacity, is controlled according to the height of the fluid above the pump inlet.

18 Claims, 18 Drawing Sheets

$$Signal = A_1 \sin [\omega_1 t + \delta_1] + A_2 \sin [\omega_2 t + \delta_2] + \ldots$$

FIG. 6a
PRIOR ART $$Signal = [B_1 \sin [\sigma_1 t + \tau_1] + B_2 \sin [\sigma_2 t + \tau_2]] *$$
$$[C_1 \sin [\lambda_1 t + \kappa_1] + C_2 \sin [\lambda_2 t + \kappa_2] + \ldots]$$

FIG. 6b

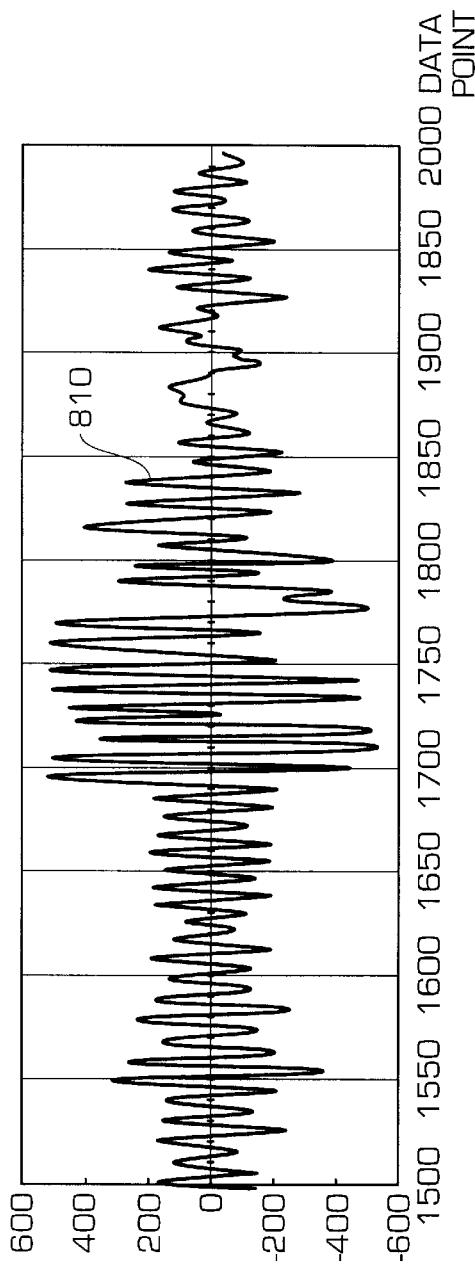
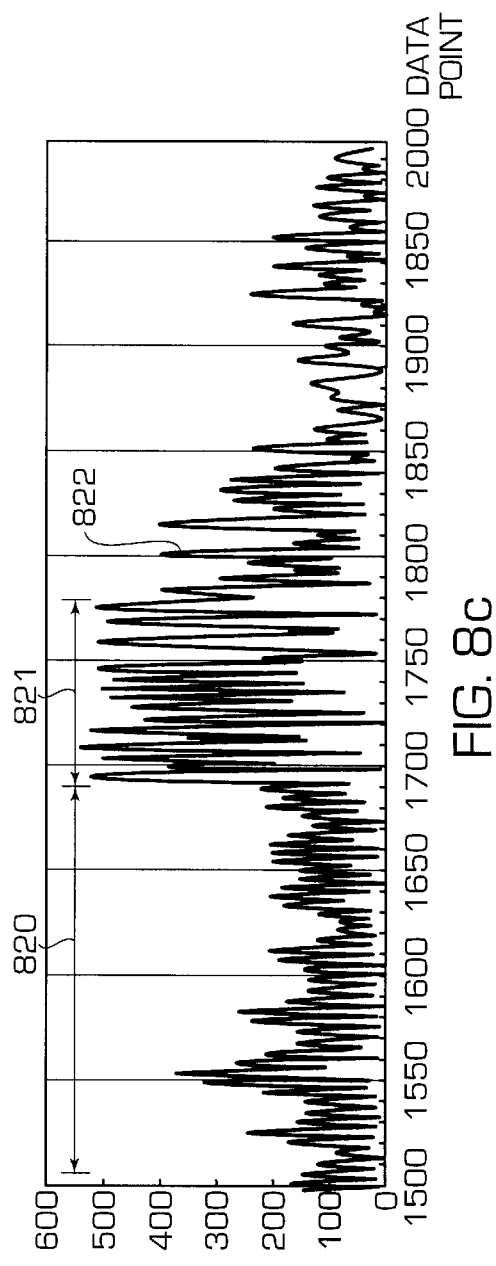

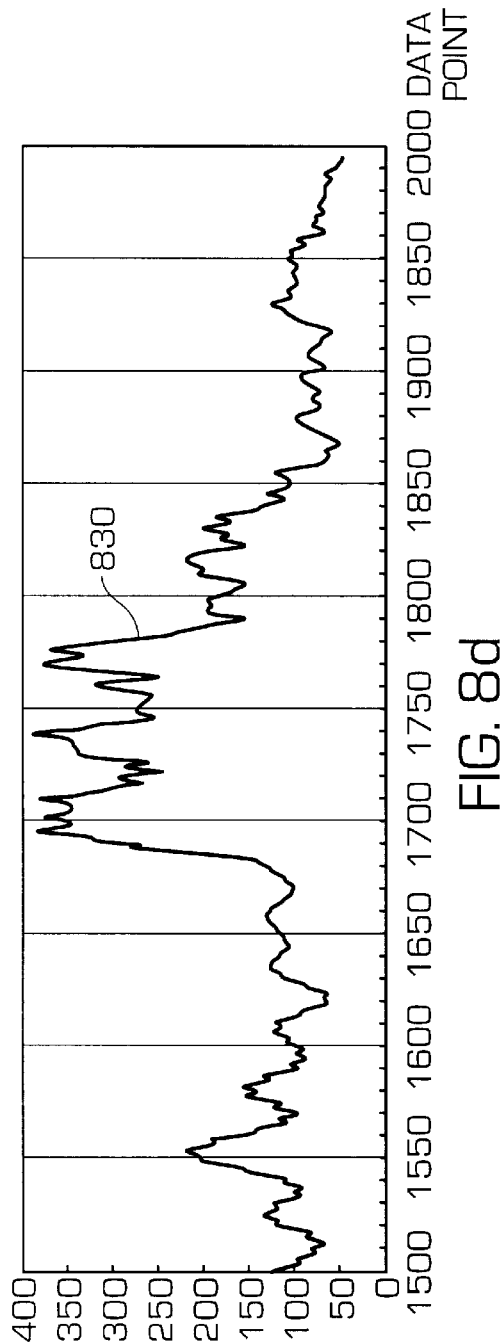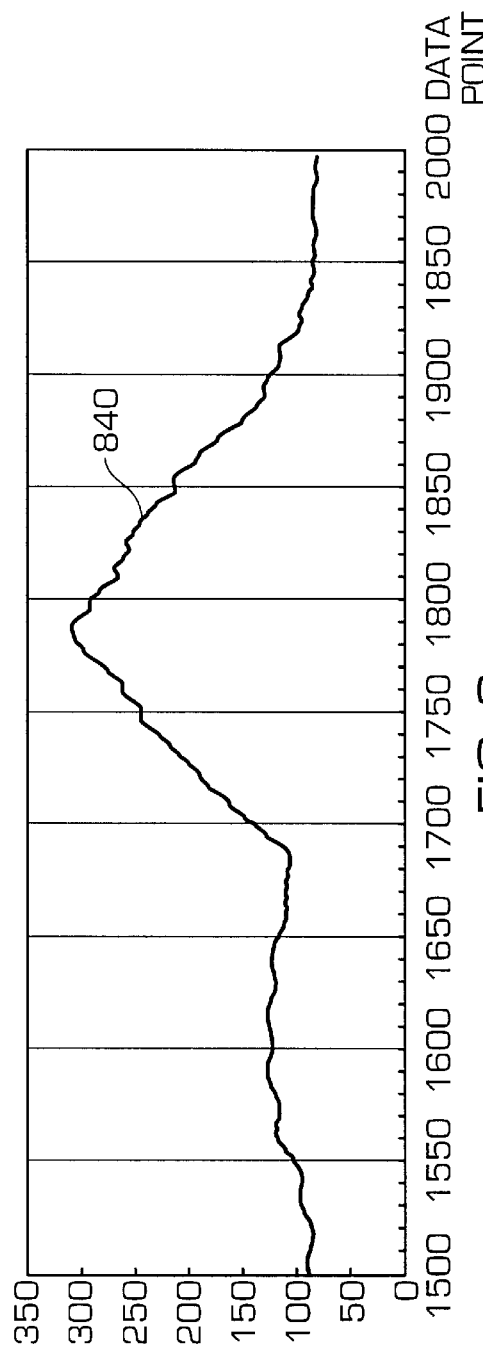

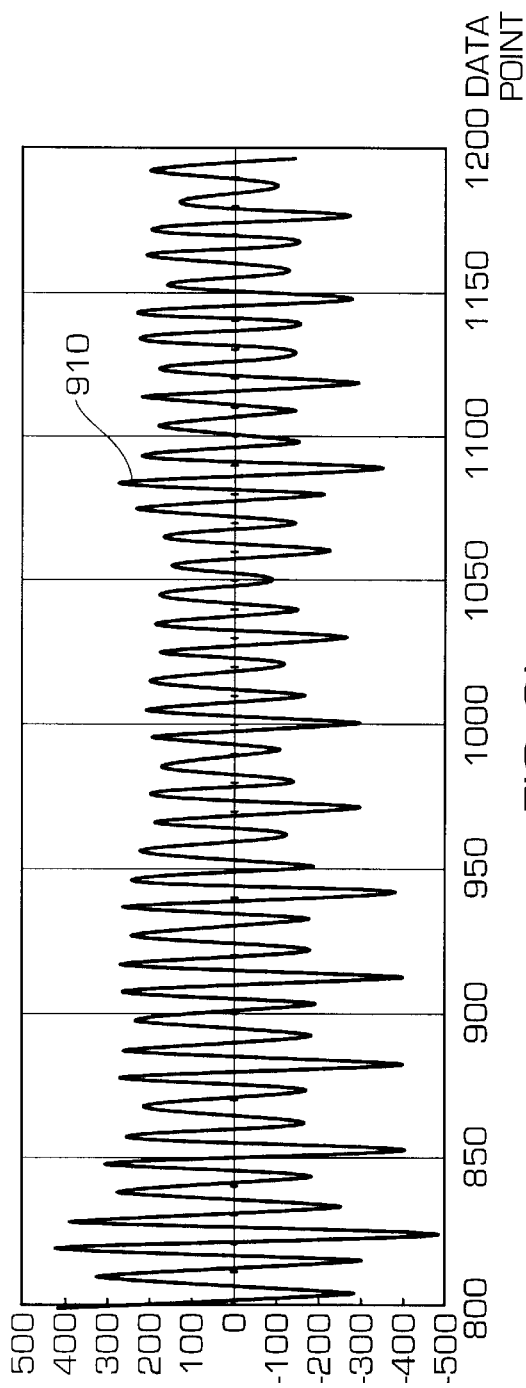
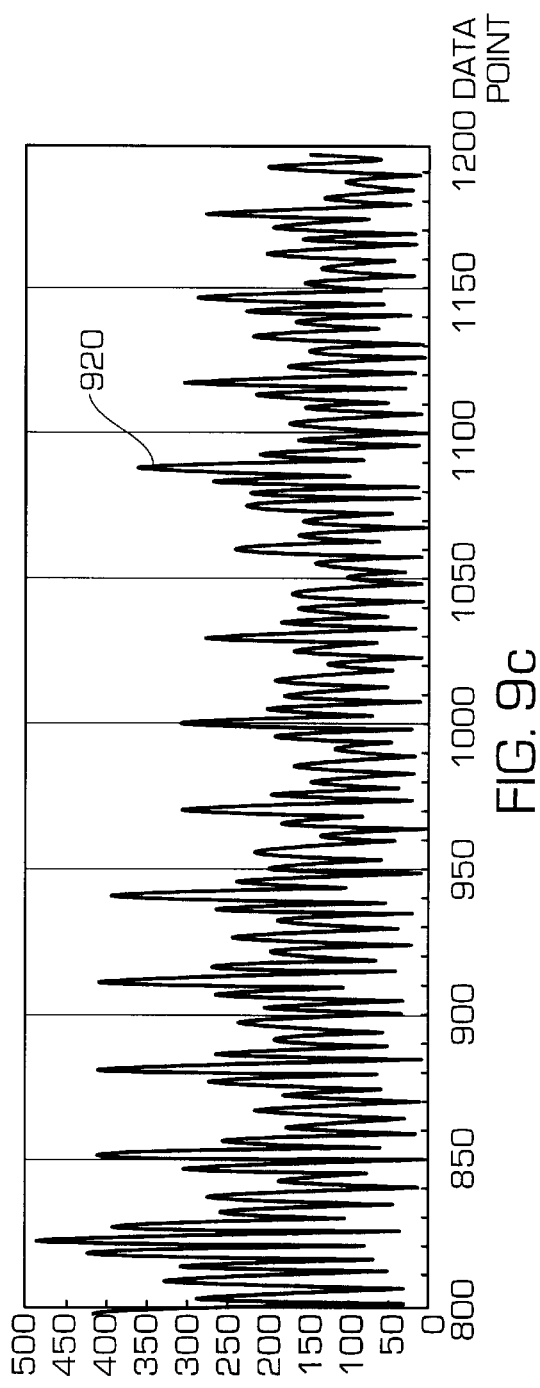

METHOD FOR CONTROLLING THE SPEED OF A PUMP BASED ON MEASUREMENT OF THE FLUID DEPTH IN A WELL

This application is a 371 of PCT/CA97/00734 filed Oct. 6, 1997 and also claims the benefit of Provisional No. 60/028,083 filed Oct. 7, 1996.

BACKGROUND OF THE INVENTION

The present invention is directed to a method for controlling the speed of a fluid pump in accordance with a measured fluid level and a method to determine the fluid level by transmitting a sonic pulse into the well casing, detecting reflections of the sonic pulse from collars on the tubing inside the well casing, detecting the pulse reflected from the fluid surface and accumulating distance for the collars from the top of the well to the point of reflection from the surface.

According to the invention, fluid production from a well can be increased without pumping the well dry, by controlling pumping capacity of the pump. Pumping capacity can be controlled by, for example, adjusting the speed of a reciprocating, rotary or submersible pump. To prevent the pump from running dry, the level of the fluid is measured using a fluid level measuring instrument and a minimum fluid head is maintained above the inlet to the pump. The fluid level instrument operates by sending an acoustic pulse into an annulus between the well casing and the production tubing and sensing reflections of the acoustic pulse from collars on the tubing and a reflection from the fluid surface. Since the collar spacing on the production tubing is known, the distance from the top of the well to the surface of the fluid can be obtained by accumulating the distance associated with the collars detected in the reflection signal.

DESCRIPTION OF RELATED ART

When a well is pumped more quickly than the formation is able to supply fluid to the well casing, the pump will not completely fill and the pump will try to pump gases as well as liquid. This pump-off condition will cause damage to the pumping equipment and reduces the efficiency of the pump. To optimize the production from the well, it is desirable to pump as quickly as possible without creating a pump-off condition.

Prior art pump controllers such as described in U.S. Pat. No. 4,286,925 by Standish use a measurement of the load on the polished rod of the pump to determine when pump-off has occurred. The pump is then stopped for a period of time to allow the formation to replenish the fluid in the well casing before the pump is restarted.

Prior art pump controllers such as described in U.S. Pat. No. 3,953,777 by McKee measure the electric current consumption of the pump motor and when the load on the motor decreases because of the pump-off condition, the motor is turned off for a period of time.

Prior art pump controllers such as described in U.S. Pat. No. 4,318,674 by Godbey et al use a fluid level measuring device with upper and lower limits that determine when the pump should be started or stopped.

Prior art pump controllers such as described in U.S. Pat. No. 4,973,226 by McKee vary the pumping speed to maintain a condition of partial pump-off. The input signal that is used by the controller to determine if the speed of the pump should be increased or decreased is based on the load on the polished rod of the pump. It is not desirable to operate the pump continuously in a partial pump-off state.

There are other advantages to maintaining a continuous output from the well rather than having the well turned off for periods of time. For example, in locations where the above-ground pump works could freeze in cold weather if the flow of fluid is stopped, it is advantageous to maintain a continuous output.

In the present invention, the controller periodically measures the fluid level in the well and adjusts the speed of the pump to maintain a minimum desired head of fluid above the inlet to the pump. This will optimize the production of the well, maintain a continuous output from the pump and prevent even partial pump-off.

It is critical to the operation of a pump controller that the fluid level measurement be reliable. There have been prior attempts to produce a fluid level measuring instrument that will return a suitable signal for use by a controller. Most fluid level measurement methods utilize an estimated acoustic velocity and the return time of the echo of an acoustic pulse that is generated at the top of the well and allowed to travel down the well casing and reflect from the fluid surface. There are problems with these prior methods because of changes in the acoustic velocity in the gases above the fluid surface due to changes in gas composition and changes in pressure in the well casing.

Prior attempts have been made to calibrate for these changes. For example the acoustic velocity device described in U.S. Pat. No. 5,200,894 by McCoy uses reflections off the collars on the production tubing string to calculate an estimate of the acoustic velocity.

Prior methods for determining depth in a well as described in U.S. Pat. No. 5,200,894 by McCoy use a method of counting tubing joints and applying the average distance between collars to the number of joints counted. A disadvantage of these methods lies in the method of detecting the collars. The present invention provides an improvement in the method of detecting collars because it uses an amplitude demodulation of the amplitude envelope of a broad-band signal received from a microphone rather than using the fundamental frequency component of the collar reflection signal.

The present invention also uses an acoustic pulse transmitted into the well casing, but it uses an improved method to detect the collar reflections from the top of the well to the point of reflection from the fluid surface and then accumulates the known distance between the collars which hold together the tubing sections to determine the distance from the top of the well to the fluid surface.

Prior art methods of analyzing the signal received from the microphone caused by the reflection from collars assumes that the signal is the sum of several sinusoidal terms as shown in the following equation, which is reproduced in FIG. 6a:

$$A_1 \sin(\omega_1 t + \delta_1) + A_2 \sin(2\omega_1 t + \delta_2) + A_3 \sin(3\omega_1 t + \delta_3) + \ldots \quad (1)$$

The sinusoidal term (the $A_1 \sin(\omega_1 t + \delta_1)$ term) representing the fundamental frequency caused by an acoustic wave front reflecting from the collars is filtered from the signal.

The collar reflection frequency depends on the collar spacing and the speed of sound in the gases in the annulus. Considerable effort is used in prior art methods to determine this fundamental frequency and filter the signal from the microphone with a very selective bandpass filter to exclude all of the signal except the collar reflection frequency. Prior art methods of determining the distance from the top of the well to the fluid surface measure the return time of the reflection signal from the fluid surface and by applying the average speed of sound in the annulus they can calculate the distance. In prior art arrangements the purpose for detecting collar reflections in the reflection signal is to allow for calculation of the speed of sound at various depths in the annulus.

In developing the present invention, it was determined that if the acoustic pulse transmitted down the annulus has a fast rise time then the signal received by the microphone appears to be an amplitude modulated signal that can be represented by the product of sinusoidal terms of the following equation:

$$[B_1 \sin(\sigma_1 t+\tau_1)+B_2 \sin(\sigma_2 t+\tau_2)+ \ldots ]*$$
$$[C_1 \sin(\lambda_1 t+\kappa_1)+C_2 \sin(\lambda_2 t+\kappa_2)+ \ldots ] \quad (2)$$

The acoustic system in the well appears to be underdamped and a reflection of the incident acoustic pulse from a collar will generate an amplitude modulated acoustic reflection signal. By receiving a wide band signal from the microphone and performing an amplitude demodulation, the coefficients of the sinusoidal term representing the collar reflection frequency in the demodulated signal provides a significantly better signal than the signal obtained by filtering the sinusoidal term (the $A_1 \sin(\omega_1 t+\delta_1)$ term) representing the fundamental frequency caused by an acoustic wave front reflecting from the collars from the acoustic signal.

To further differentiate the present method of amplitude demodulation from prior art methods of filtering it must be understood that the broadband signal received by the microphone contains two basic characteristics. Both characteristics are produced by reflections of the incident acoustic pulse from collars or the fluid but are detected in fundamentally different ways.

The broadband reflection signal received by the microphone contains a sum of many sinusoidal frequency components. One of these components relates to the direct reflection of the incident acoustic pulse. For reflections from collars, this direct reflection signal has a repetition frequency that is called the fundamental collar reflection frequency. Prior art collar detection methods filter the reflection signal to isolate this collar reflection frequency from all of the other frequency components in the reflection signal.

The broadband reflection signal received by the microphone also contains an amplitude modulated aspect. This aspect of the reflection signal contains carrier signals that are higher frequencies than the fundamental collar reflection frequency. The higher frequency components are caused by the underdamped response of the acoustic system within the well casing to the incident acoustic pulse reflecting from the collars. The collar is identified by the amplitude modulation of these carrier frequencies. Amplitude demodulation often results in a larger signal than the direct collar reflection signal.

Amplitude demodulation is a non-linear, irreversible transformation of the original reflection signal that is able to recover the amplitude modulation information or the magnitude of the carrier frequencies. The final step of amplitude demodulation is a low-pass or band-pass filter that results in the recovery of the collar reflection signal. During the process of amplitude demodulation, the original direct collar reflection signal does not contribute to the amplitude envelope shape. The result of amplitude demodulation is exclusive of the direct collar reflection signal that prior art relies on.

A detailed description of the preferred method of detecting the amplitude envelope received by the microphone and processing the amplitude envelope shape to determine the start of the signal, the reflection from the fluid surface and the reflections from the collars is set forth below.

SUMMARY OF THE INVENTION

It is an object of the present invention to provide a method for varying the pumping speed of a well pump in accordance with the detected fluid level so as to maintain a desired fluid level in the well. This is accomplished by the following steps:

1—Periodically measuring the distance from the top of the well to the fluid surface and representing the distance as a numeric fluid depth value;

2—subtracting the fluid depth value from a setpoint depth value that is less than or equal to the known distance from the top of the well to the inlet of the pump to produce a fluid difference value;

3—increasing the speed of the pump to increase the pumping capacity (which will tend to lower the fluid surface in the annulus) if the fluid difference value is positive (i.e., the fluid surface is above the desired head of fluid);

4—decreasing the speed of the pump to decrease the pumping capacity (which will tend to raise the fluid surface in the annulus) if the fluid difference value is negative (i.e., the fluid surface is below the desired head of fluid).

It is a further object of the present invention to provide a method for accurately determining the fluid level in a well using an acoustic pulse technique. This is accomplished using the following steps:

1—Initiating transmission of an acoustic pulse, having a rapid rate of rise in pressure, from the top of the well into the annulus;

2—using a transducer mounted at the top of the well to generate an electrical signal corresponding to pressure and using the electrical signal to detect acoustic reflection pulses caused by the acoustic pulse traveling down the annulus when the acoustic pulse impinges onto the collars and the fluid surface so that the electrical signal is an analog reflection signal;

3—converting the analog reflection signal into digital values to produce a digital reflection signal where the conversion takes place at a fixed sample rate;

4—storing the digital reflection signal into a data memory array to produce a stored digital signal where the location of each digital value of the digital reflection signal is known by its location in the memory array;

5—processing the stored digital signal to produce a magnitude signal representative of the amplitude modulated envelope shape of the magnitude of the stored digital signal;

6—examining the magnitude signal to determine the location of the start of the collar data within the stored digital signal;

7—examining the magnitude signal to determine the location of the reflection from the fluid surface within the stored digital signal;

8—filtering the magnitude signal with a digital bandpass filter where the passband is set to include the characteristic frequency of acoustic reflection pulses from the collars to produce a collar reflection signal;

9—detecting reflections from collars as peaks of the collar reflection signal between the location of the start of the collar data and the location of the reflection from the fluid surface within the stored digital signal to produce a collar data array;

10—applying the known distance between collars to every collar detected in the collar data array and accumulating the distance from the start of collar data to the reflection from the fluid surface.

BRIEF DESCRIPTION OF THE DRAWINGS

The above-described objects and advantages of the present invention will become more apparent by describing in detail a preferred embodiment thereof with reference to the accompanying drawings in which:

FIG. 6a is a formula used by prior art fluid level measuring instruments to describe the signal generated by the microphone.

FIG. 6b is a formula used by the present invention to describe the signal generated by the microphone.

FIG. 7b is a graph of a portion of the signal including the start of the reflection signal detected by a microphone used as an input to the fluid level instrument to be processed using the method shown in FIG. 7a.

FIG. 8b is a graph of a portion of the signal including the reflection from the fluid surface that is produced by the microphone.

FIG. 8c is a graph of the absolute value of the signal shown in FIG. 8b.

FIG. 8d is a graph of the amplitude envelope shape of the signal shown in FIG. 8b that is generated by a rolling average of the following 25 data points.

FIG. 8e is a graph of the amplitude envelope shape of the signal shown in FIG. 8b that is generated by a rolling average of the previous 100 data points.

FIG. 9b is a graph of a portion of the signal between the start of the signal and the fluid reflection that is produced by the microphone that includes signals caused by reflections from collars.

FIG. 9c is a graph of the absolute value of the signal shown in FIG. 9b.

DETAILED DESCRIPTION OF THE PREFERRED EMBODIMENT

Figure 1:
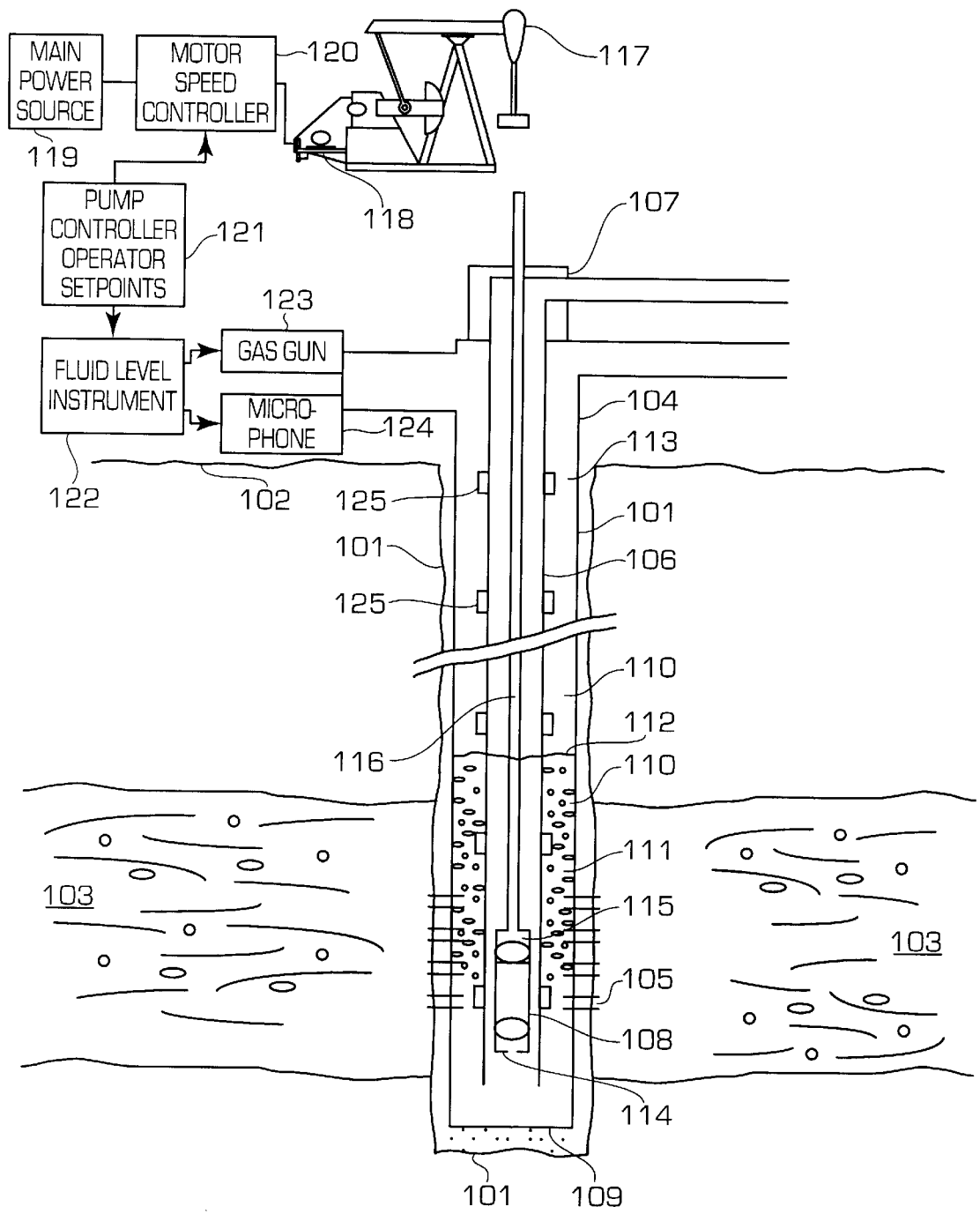
FIG. 1 is a pictorial drawing showing a typical well with a downhole reciprocating pump operated by a motorized pump jack and functional blocks representing a motor speed controller, pump controller and fluid level measuring instrument.

The present invention is directed to a method for controlling a downhole reciprocating, rotary or submersible pump to maximize fluid production from a well without pumping the well dry, and to a device for practicing the method. With reference to FIG. 1, a typical oil well installation consists of a hole 101 drilled from the surface 102 of the earth down to the formation 103 that contains the fluid to be pumped. The borehole is cased with a cylindrical pipe known as the well casing 104 that has perforations 105 to allow the fluid in the formation 103 to enter the casing. A cylindrical pipe known as the production tubing 106 is fitted inside the well casing 104 from the top of the well 107 and is attached to a downhole reciprocating pump 108 which is located near the bottom of the well 109. The annulus 110 between the well casing 104 and the production tubing 106 is allowed to partially fill with fluid from the formation 103 creating a fluid column 111 and a fluid surface 112 in the annulus. The annulus 110 above the fluid surface 112 is a column 113 filled with a mixture of gases. The pump 108 has an inlet 114 to accept fluid from the well casing 104 and an outlet 115 to discharge the pump fluid into the production tubing 106. The pump 108 is operated by a rod string 116 connected to a pumpjack 117 at the top of the well 107.

In order to maximize the fluid production from the oil well, it is desirable to pump the fluid 111 from the casing 104 as fast as the fluid is supplied through the perforations 105 to the casing from formation 103. If the pump 108 is removing less fluid than is entering the casing 104 then the fluid surface 112 will tend to rise. If the pump 108 is removing more fluid than is entering the casing 104 then the fluid surface 112 will tend to lower. If the pump 108 continues to remove fluid at a rate that is faster than the fluid entering the casing 104 then the pump will be partially filled with fluid and partially filled with gases. This condition results in inefficient operation of the pump 108 and may cause damage to the pump, the rod string 116 and the pumpjack 117. The maximum amount of fluid production is obtained when the fluid surface 112 is just above the inlet 114 to the pump 108.

The capacity of the pump 108 is proportional to the speed of reciprocation of the pumpjack 117. For the preferred embodiment of the present invention, the pumpjack 117 is powered by a variable speed electric motor 118, but as will be appreciated by those skilled in the art, other arrangements are possible. The motor 118 is operated by a main power source 119 through a motor speed controller 120. The setpoint for the speed of the motor 118 is provided by a pump controller 121 based on the location of the fluid surface 112 as measured by a fluid level instrument 122.

The fluid level instrument 122 is a device which can determine that the fluid surface 112 is above inlet 114 of the pump 108. The head of fluid is defined as the height of fluid in the annulus 110 above the inlet 114 of the pump 108. In the preferred embodiment, the pump controller 121 determines the head of fluid by subtracting the distance from the top of the well 107 to the fluid surface 112 received from the fluid level instrument 122 from the known distance from the top of the well to the inlet 114 of the pump 108.

Figure 2:
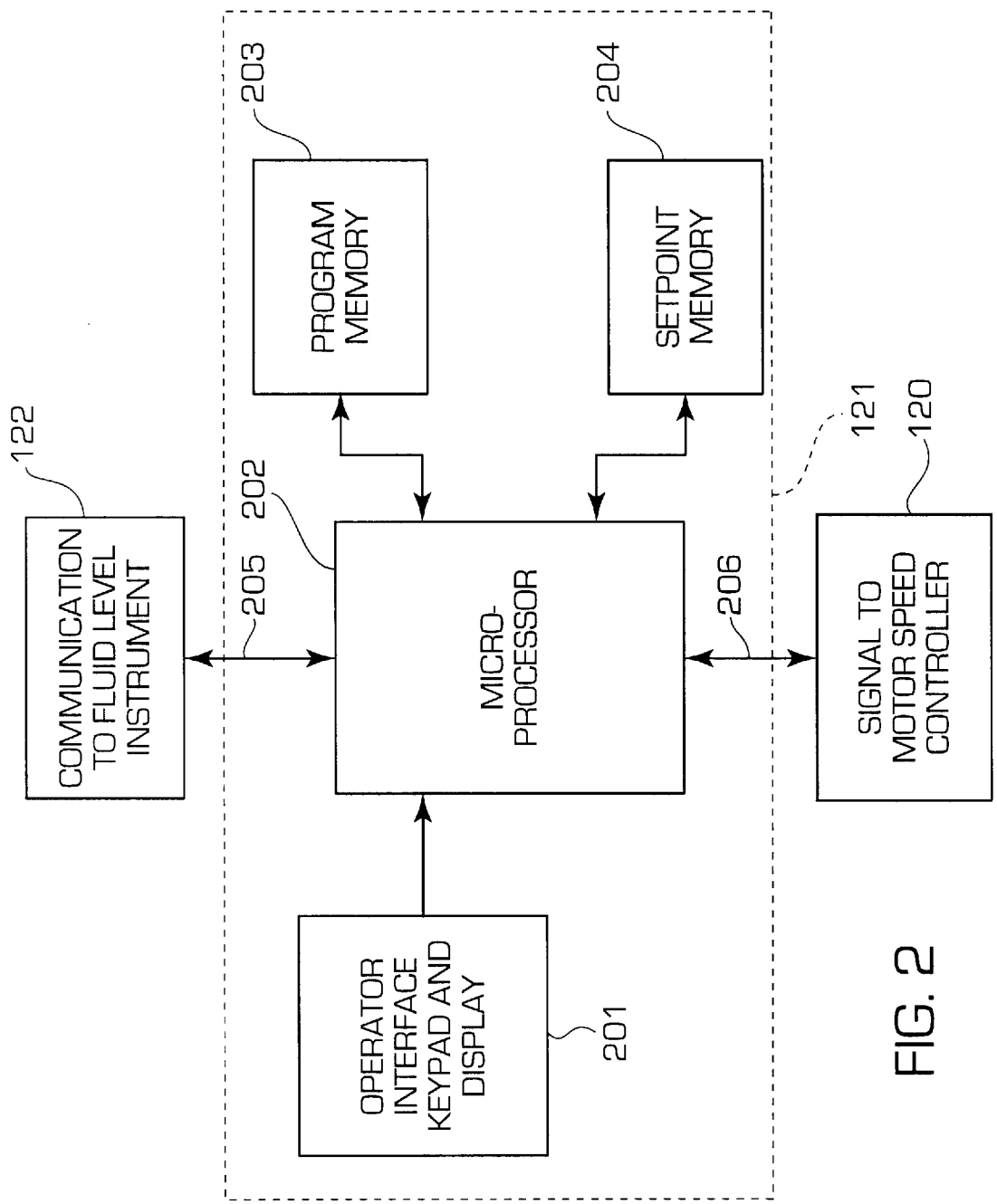
FIG. 2 is a functional block diagram of a pump controller.

FIG. 2 is a functional block diagram of a microprocessor based pump controller 121. In the preferred embodiment there is an operator interface 201 with a keypad for input and a display for viewing setpoints, status messages and plots of operating data. The microprocessor 202 has program memory 203 and setpoint memory 204. Communication interface 205 allows the pump controller 121 to request a fluid level measurement from the fluid level instrument 122 and to receive the resultant fluid level value from the fluid level instrument. Additionally, communication interface 206 is operationally connected to the motor speed controller 120 for the purpose of supplying the motor speed controller 120 with the setpoint for the speed of the motor 118.

Figure 3:
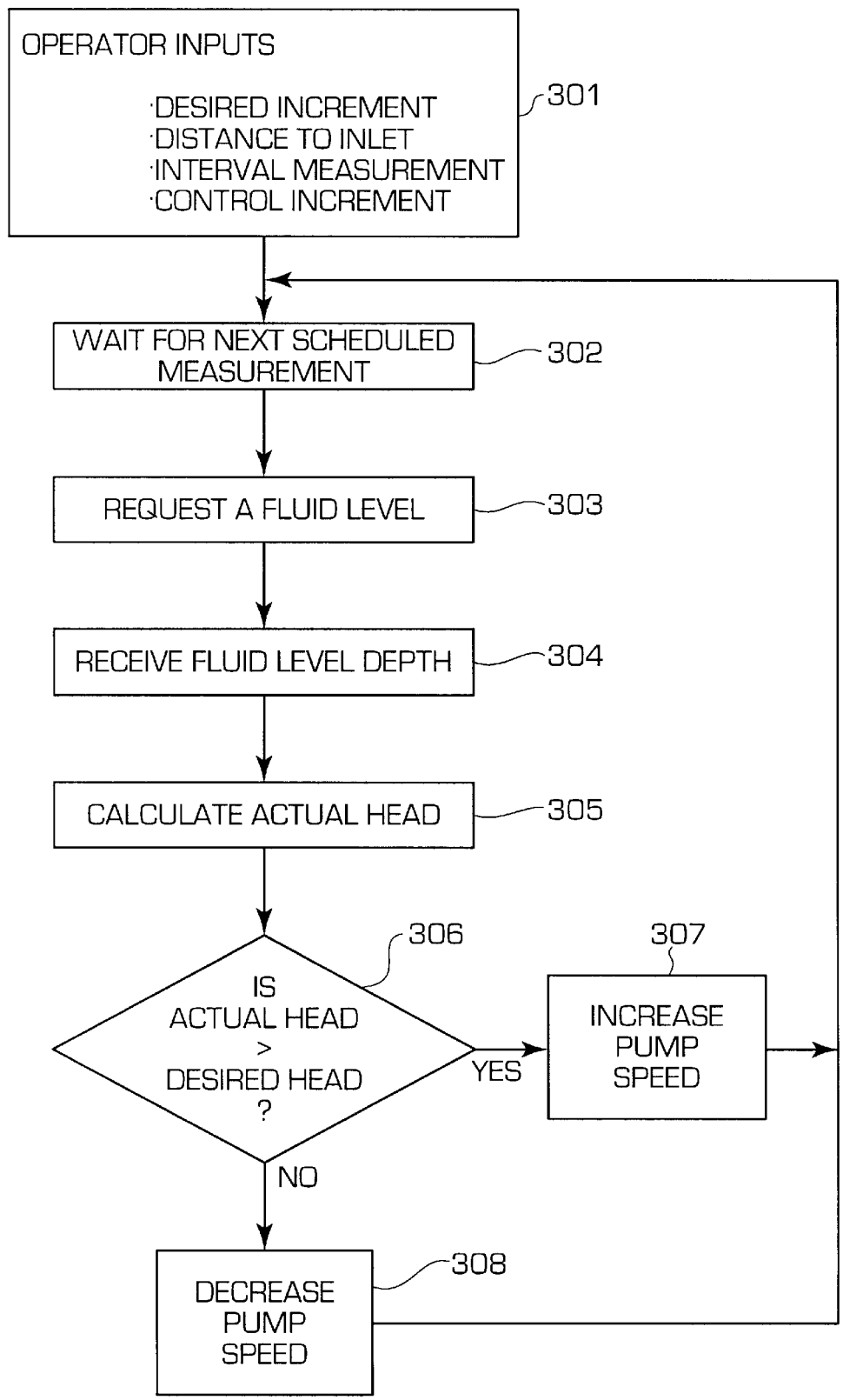
FIG. 3 is a flow chart of the algorithm used in a pump controller.

FIG. 3 is a flow chart of the algorithm used in the pump controller 121. In the preferred embodiment there is an operator input 301 which allows the operator to enter values for the desired head of fluid, the known distance from the top of the well 107 to the inlet 114 of the pump 108, an interval for measurement of the fluid level, and the control increment for the change in setpoint for the speed of the motor 118. In another embodiment of the invention there is an operator input 301 which allows the operator to enter values of minimum and maximum speed of the motor 118 to limit the range of the setpoint speed of the motor in order to prevent damage to the pump 108, the rod string 116, or the pumpjack 117.

Practically speaking, in an oil well it is desired to maintain a fluid head slightly greater than zero and preferably 20 meters because the rate of fluid received from the formation 103 changes from time to time. Since the response of the formation 103 to supply fluid to the well casing 101 is typically from minutes to hours, it is only necessary to determine the fluid head periodically rather than continuously. Most fluid level instruments require a minimum amount of time to determine the distance from the top of the well 107 to the fluid surface 112 so the interval for measurement of the fluid level cannot be less than the minimum allowable. In order for the control system to be stable, the gain of the control loop is determined by the size of the increment for the change in setpoint for the speed of the motor 118. Typically the size of the increment for the change in setpoint for the speed of the motor 118 is proportional to the interval for measurement of the fluid level.

Step 302 of the control loop of FIG. 3 requires the pump controller 121 to wait for the next scheduled measurement of the fluid level which is the distance from the top of the well 107 to the fluid surface 112. At step 303 the pump controller 121 will request a fluid level from the fluid level instrument 122. At step 304 the pump controller 121 will receive the fluid level depth from the fluid level instrument 122. At step 305 the actual head is calculated by subtracting the fluid level depth from the known distance from the top of the well 107 to the inlet 114 of the pump 108. A comparison is made at step 306 between the actual head and the desired head. If the actual head is greater than the desired head then at step 307 the pump controller 121 sends a message to the motor speed controller 120 to increase the speed of the pumpjack 117 by the control increment. If the actual head is less than the desired head then at step 308 the controller 121 sends a message to the motor speed controller 120 to decrease the speed of the pumpjack 117 by the control increment.

The preferred fluid level instrument measures the distance from the top of the well to the fluid surface by transmitting a sonic pulse into the annulus of the well and sensing the reflection of the sonic pulse from the fluid surface using a microphone. Referring to FIG. 1, the production tubing 106 is a series of pipe sections joined together with a cylindrical collar 125 at each joint where the collars protrude into the annulus 110 between the production tubing string and the well casing 104. The sonic pulse is generated from a gas operated gun 123 attached to the top of the well 107 by releasing a pulse of pressurized gas into the annulus 110. A characteristic of the acoustic pulse must be that it has a rapid rate of rise of pressure in order to detect reflections of the acoustic pulse from the collars 125 on the production tubing string 106 as well as the reflection of the acoustic pulse from the fluid surface 112. The fluid level instrument 122 sends a signal to the gas gun 123 which causes the gas gun to release a pulse of pressurized gas. A gas gun with these characteristics is commercially available from Tri-Ener-Tech Petroleum Services Ltd. Calgary, Alberta, Canada.

A pressure-to-electrical signal transducer such as a microphone 124 is mounted at the top of the well 107 to detect acoustic reflection pulses in the annulus 110 caused by the acoustic pulse traveling down the annulus when the acoustic pulse impinges onto the collars 125 and the fluid surface 112.

Figure 4:
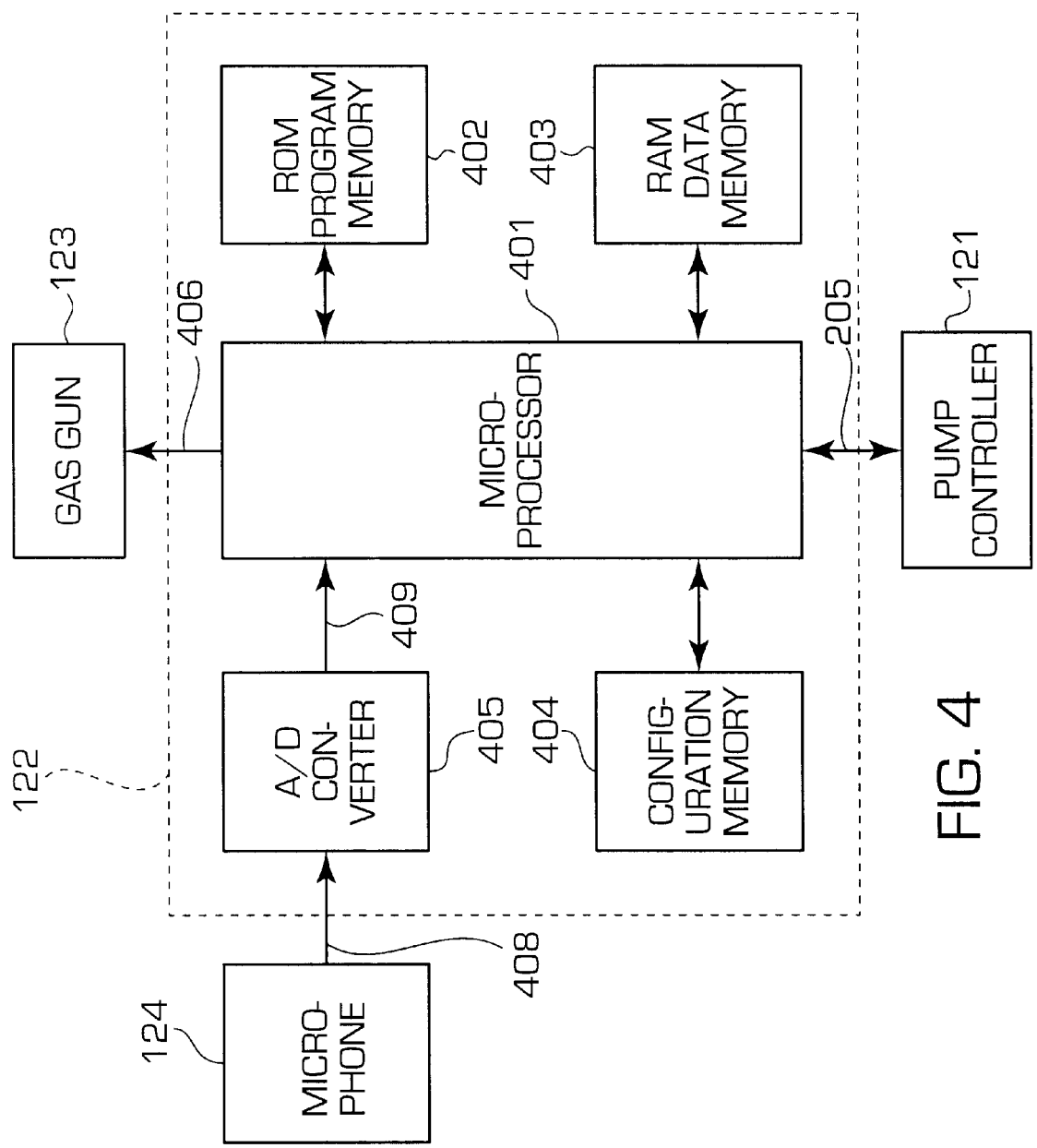
FIG. 4 is a functional block diagram of a fluid level measuring instrument.

FIG. 4 is a functional block diagram of a microprocessor based fluid level measuring instrument 122. The preferred embodiment includes a microprocessor 401 with ROM program memory 402, RAM data memory 403, configuration memory 404, an A/D converter 405 to convert the analog reflection signal 408 from the microphone 124 to a digital reflection signal 409, a communication interface 406 to the gas gun 123, and a communication interface 205 to the pump controller 121.

Figure 5:
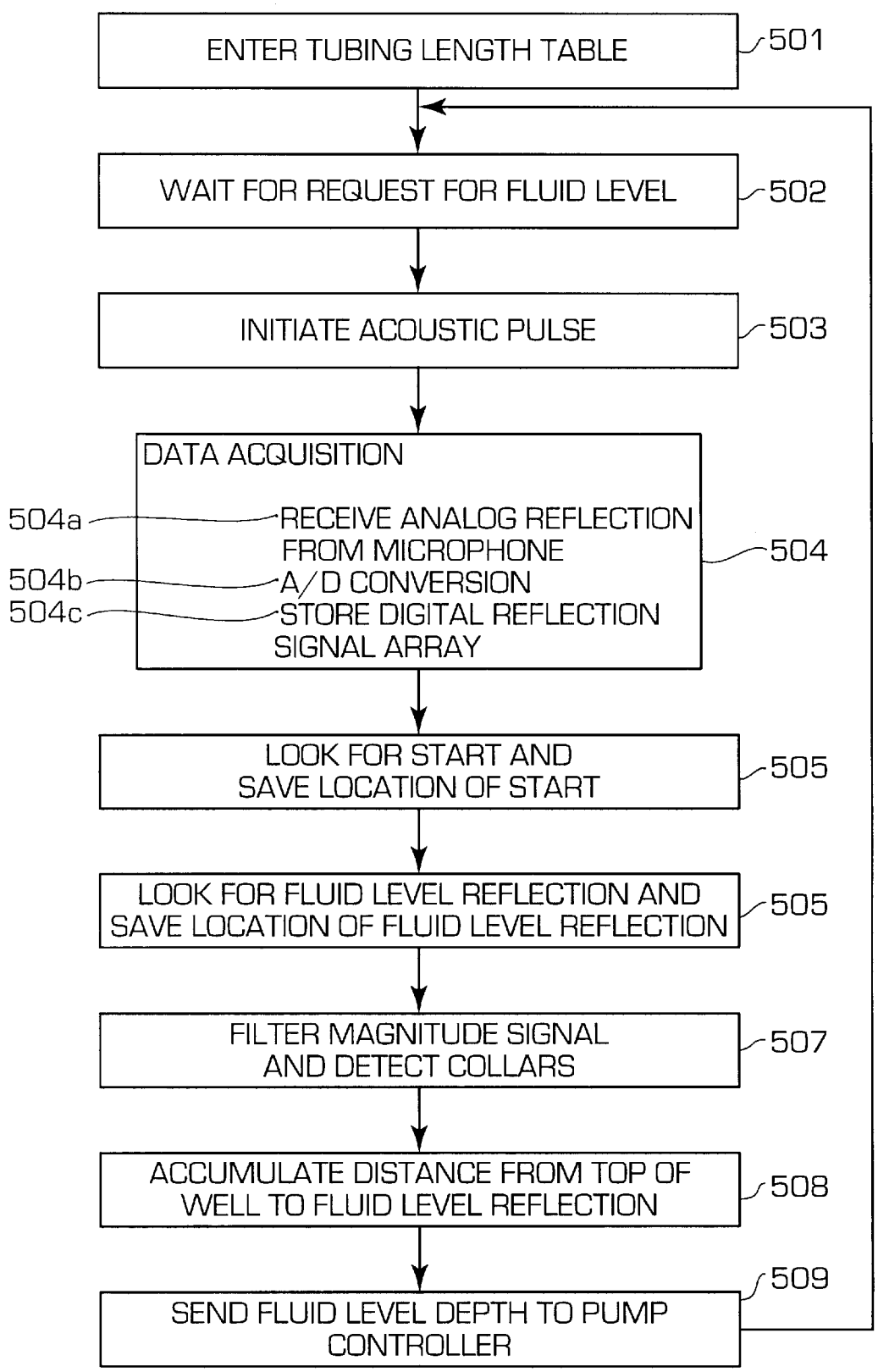
FIG. 5 is a flow chart of the process used in the preferred fluid level measuring instrument to determine the fluid level depth.

FIG. 5 is a flowchart of the process used in the preferred fluid level measuring instrument to determine the fluid level depth. The process is to detect production tubing collar reflections in the digital reflection signal and accumulate the distance associated with each section of the production tubing string from the top of the well to the reflection from the fluid surface. Prior to initiating the process, a table of lengths of production tubing, which is also known as the collar spacing, must be entered at step 501 into the configuration memory 404. This table is entered using the operator interface 201 of the pump controller 121 and sent to the fluid level instrument 122 via the communication interface 205. Another arrangement would be to enter the average length of the production tubing.

The control loop of FIG. 5 requires the fluid instrument 122 to wait for a request for a fluid level 502 from the pump controller 121. When a request is received from the pump controller 121 the fluid level instrument 122 sends a signal 406 to the gas gun 123 at step 503 to initiate the acoustic pulse. Step 504 performs data acquisition which includes the steps of receiving the analog reflection signal 408 from the microphone 124, converting the analog reflection signal to a digital reflection signal 409 and storing the digital reflection signal in RAM data memory 403. The process of the present invention to analyze the reflection data requires that the digital reflection signal 409 be a wide band representation of the analog reflection signal 408 received by the microphone 123. The A/D converter 405 preferably samples the analog reflection signal 408 at a constant rate of at least 500 samples per second.

Prior art methods of analyzing the signal received from the microphone caused by the reflection from collars assumes that the signal is the sum of several sinusoidal terms as shown in the equation in FIG. 6a. The sinusoidal term representing the fundamental frequency caused by an acoustic wave front reflecting from the collars is filtered from the signal. The collar reflection frequency depends on the collar spacing and the speed of sound in the gases in the annulus. Considerable effort is used in prior art methods to determine this fundamental frequency and filter the signal from the microphone with a very selective bandpass filter to exclude all of the signal except the collar reflection frequency. Prior art methods measure the return time of the reflection signal from the fluid surface and apply the average speed of sound in the annulus to calculate the distance from the top of the well to the fluid surface. In prior art methods the purpose for detecting collar reflections in the reflection signal is to allow for calculation of the speed of sound at various depths in the annulus.

In developing the present invention, it was determined that if the acoustic pulse transmitted down the annulus has a fast rise time, the signal received by the microphone is an amplitude modulated signal that can be represented by the product of sinusoidal terms as shown in the equation in FIG. 6b. The acoustic system in the well appears to be underdamped and a reflection of the incident acoustic pulse from a collar will generate an amplitude modulated acoustic reflection signal. By receiving a wide band signal from the microphone and performing an amplitude demodulation, the coefficients of the sinusoidal term representing the collar reflection frequency in the demodulated signal provides a significantly better signal than the signal obtained by filtering the sinusoidal term (the $A_1 \sin(\omega_1 t + \delta_1)$ term) representing the fundamental frequency caused by an acoustic wave front reflecting from the collars from the acoustic signal. A detailed description of the preferred method of detecting the amplitude envelope received by the microphone and processing the amplitude envelope shape to determine the start of the signal, the reflection from the fluid surface and the reflections from the collars follows.

The data memory 403 contains an array representing the digital reflection signal where each memory address contains a value indicative of the digital reflection signal value at a particular time from the beginning of the digital reflection signal. The data memory 403 will be contiguous and will have a starting address that is known to the software operating system. The location of each data point is related to the address offset from the start of the array. The data is preferred to be stored in 16 bit wide words and the resolution of the data is preferred to be 16 bits because of the large dynamic range of the signals produced by the microphone 124.

The offset from the start of the digital reflection signal data array for each data point is used as the location of specific events that occur in the signal such as the location of the 'start of reflection signal, the location of the reflection from the fluid surface 112, and the location of detected collars 125. The collar spacing measured in data points is the difference between the location values of adjacent detected collars.

Once the digital reflection signal 409 is stored at step 504, the location in data memory where the acoustic pulse was initiated must be determined at step 505. There is a delay from the signal to initiate the acoustic pulse 406 and the actual generation of the acoustic pulse that is caused by the operation of the gas gun 123 so that the start of the acoustic pulse occurs slightly after the start of recording of the analog reflection signal 408 received from the microphone 124. A detailed description of the process for determining the location of the start of the reflection signal follows with reference to FIGS. 7a–7d.

At step 506 the location of the fluid level reflection in the stored digital signal is determined in accordance with a rapid rise in the magnitude of the stored digital signal compared to the average of the magnitude of a previous segment of the stored digital signal. A detailed description of the process for determining the location of the fluid level reflection is set forth later in the specification with reference to FIGS. 8a–8f.

At step 507 the locations of the collars in the digital reflection signal are determined. This is done by locating the peaks of the amplitude envelope shape of the stored reflection signal after the amplitude envelope shape has been bandpass filtered. A detailed description of this process is set forth later in the specification with reference to FIGS. 9a–9g.

After determining the location of the start of the reflection signal, the location of the reflection from the fluid surface, and the locations of the reflection of each collar, the distance from the top of the well to the fluid surface is determined at step 508 by accumulating the distance for each collar stored in the collar spacing table. A description of this process is provided later in the specification in reference to FIGS. 10a–10c.

The fluid level depth is sent back at step 509 to the pump controller 121 for use in its control algorithm. At step 502 the fluid level instrument 122 then waits for a request for a fluid level from the pump controller.

Figure 7A:
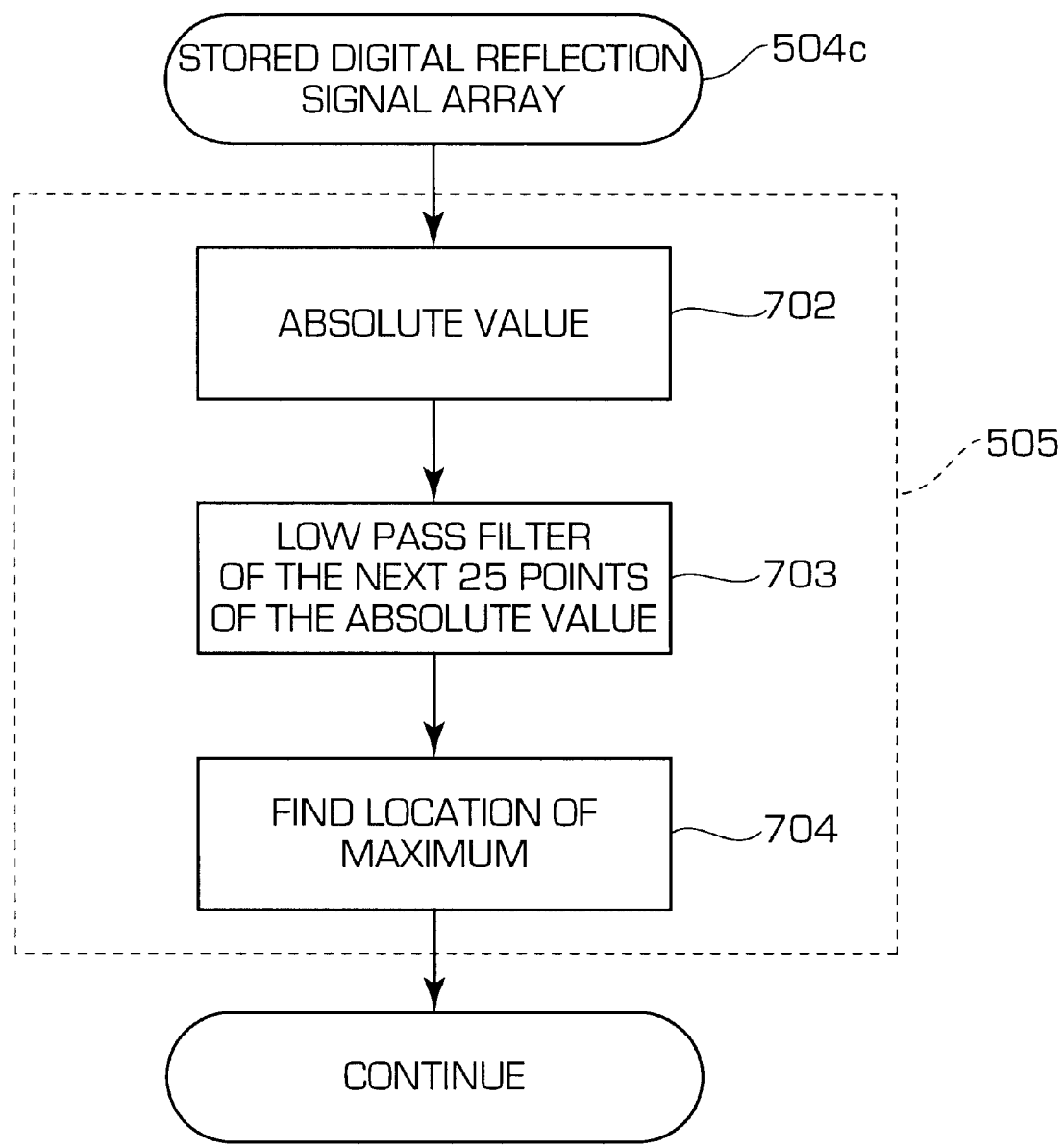
FIG. 7a is a detail flow chart of the method used to determine the location of the start of the reflection signal produced by the microphone.

FIG. 7a is a detailed flow chart of the process used to determine the location of the start of the reflection signal. The process involves calculating, at step 702, the absolute value of the stored digital reflection signal stored at step 504c, applying a low pass filter at step 703 to the absolute value and finding the location of the maximum of the filtered absolute values at step 704.

Figure 7B:
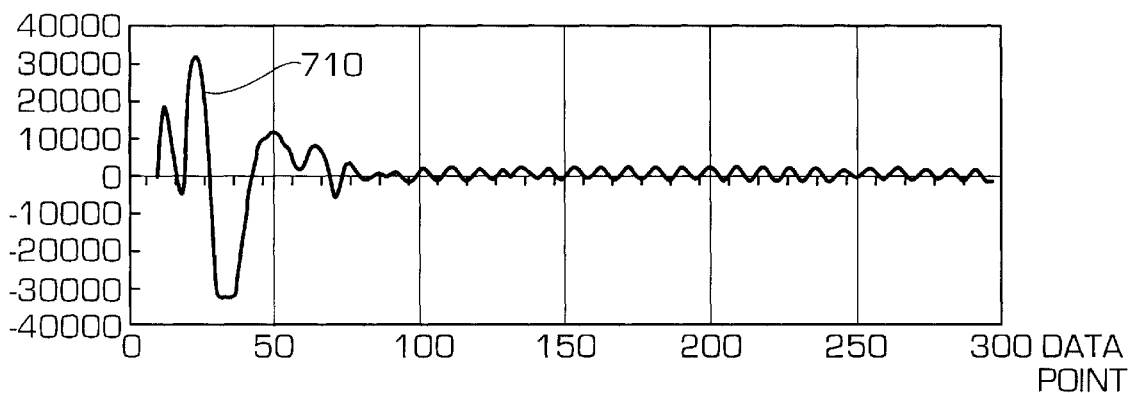

FIG. 7b shows a portion of the digital reflection signal stored at step 504c near the start of the reflection signal received by the microphone 124. The large portion 710 of the signal near the beginning of the signal is caused by the incident acoustic pulse from the gas gun 123. It can be seen that the large portion 710 of the signal appears to be an underdamped response to the incident pulse. It is preferred to consider the start of the reflection signal as the peak of the amplitude envelope of the underdamped response.

Figure 7C:
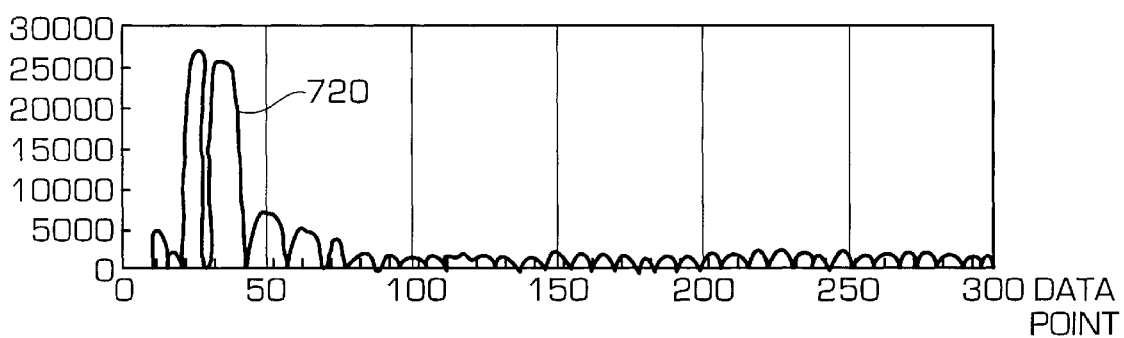
FIG. 7c is a graph of the absolute value of the signal shown in FIG. 7b.

FIG. 7c shows the preferred method of determining the amplitude envelope by calculating the absolute value 720 of the digital reflection signal stored at step 504c.

Figure 7D:
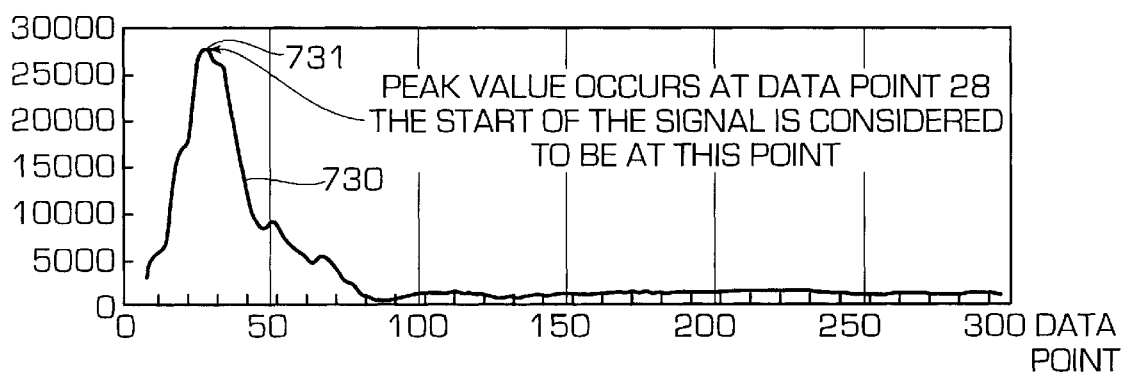
FIG. 7d is a graph of the amplitude envelope of the signal in FIG. 7b where the location of the peak value is considered to be the location of the start of the signal.

FIG. 7d shows the preferred method of applying a low pass filter to the absolute value 720 to produce low pass filtered signal 730. The location of the maximum value 731 of the low pass filtered signal 730 within the digital reflection array stored at step 504c will be considered as the start of the reflection signal.

The preferred method of providing the low pass filter is by applying a rolling average of 13 points starting 6 points to the left and continuing to 6 points to the right in the absolute value of the digital reflection signal stored at step 504c. The start of the reflection signal will never be located in the first 6 data points of the digital reflection signal array stored at step 504c. In the example shown in FIG. 7d the start of the reflection signal is at data point number 28 in the stored digital reflection signal array.

It should be noted that the above-described technique is not the only one which can be used to determine the location of the maximum value of the amplitude envelope. Other amplitude detection and digital filtering techniques could be used by someone skilled in the art of digital signal processing to find the location of the maximum value of the amplitude envelope.

Figure 8A:
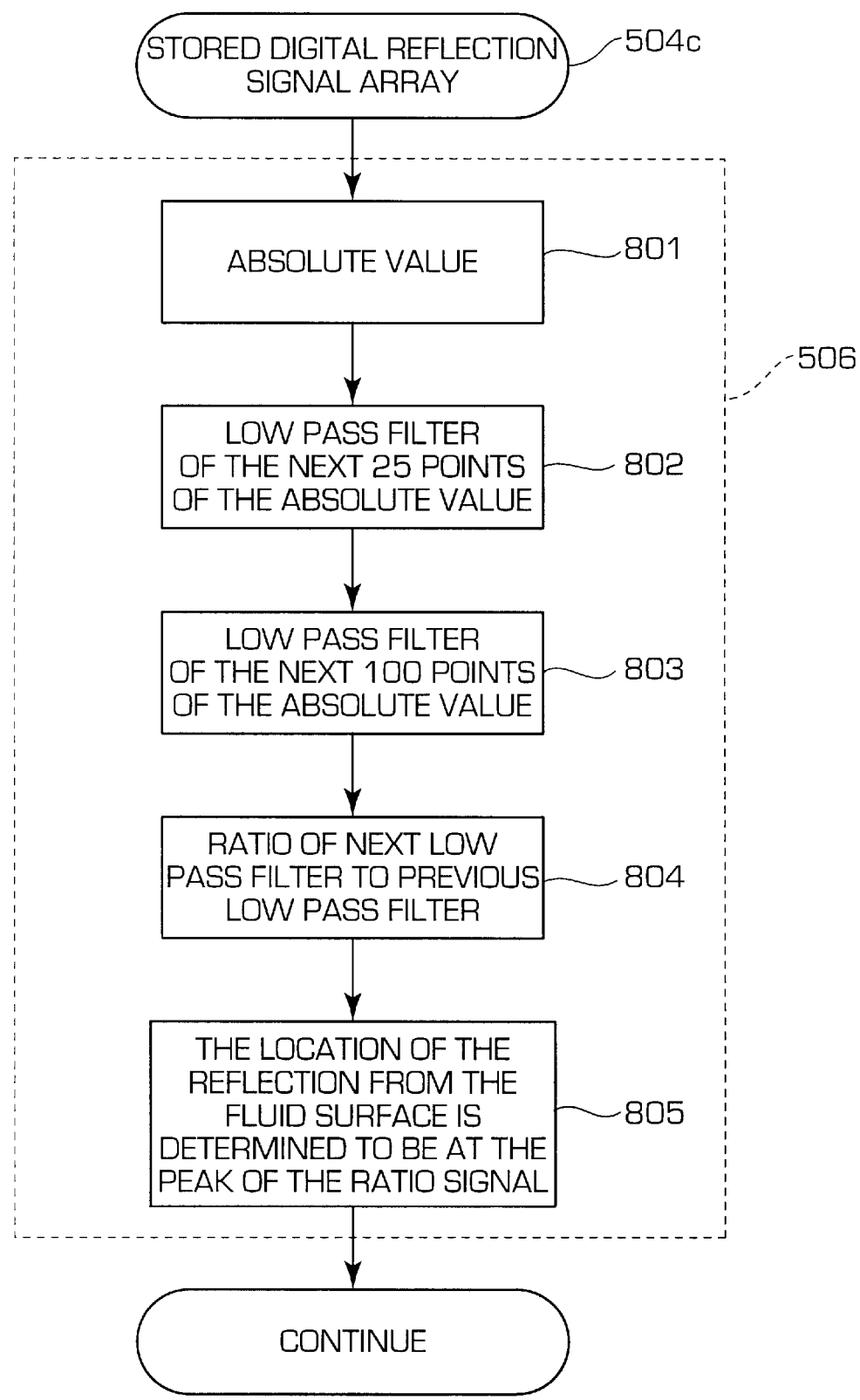
FIG. 8a is a flow chart of the method used to determine the location of reflection from the fluid surface within the signal from the microphone.

FIG. 8a is a detailed flow chart of the process used to determine the location of the reflection of the fluid surface 112. The concept is to look for a point in the data where the amplitude of the signal increases significantly from its previous average value. The process involves calculating, at step 801, the absolute value of the digital reflection signal stored at step 504c, applying two low pass filters at steps 802 and 803 with different time constants to the absolute value, calculating the ratio of the two low pass filtered waveforms at step 804, and finding the location of the maximum of the ratio at step 805.

FIG. 8b shows a portion of the digital reflection signal 810 stored at step 504c near the reflection from the fluid surface. It can be seen that the signal 810 appears to be an underdamped response to the incident acoustic pulse reflecting from the fluid surface 112. FIG. 8c is the absolute value of the portion of the reflection signal shown in 8b. The average value of the absolute value prior to the reflection from the fluid surface 820 is significantly lower than the average value of the signal just after the reflection from the fluid surface 821. In order to prevent noise impulses from being detected, a low pass filter is applied to the absolute value.

FIG. 8d shows a waveform resulting from a first low pass filtering of the absolute value 822 where the time constant of the filter is short enough to retain the amplitude envelope shape. The preferred method of providing the first low pass filter is to apply a rolling average of 25 points to the right of the present data point in the absolute value 822 of the stored digital reflection signal.

FIG. 8e is the second low pass filter of the absolute value 822 where the time constant of the filter is longer than the time constant of the first low pass filter. The preferred method of providing the second low pass filter is to apply a rolling average of 100 points to the left of the present data point in the absolute value 822 of the digital reflection signal stored at step 504c. In practice, the reflection from the fluid surface will rarely be within the first 100 points of the stored digital reflection signal. Therefore this process can begin after the first 100 data points.

Figure 8F:
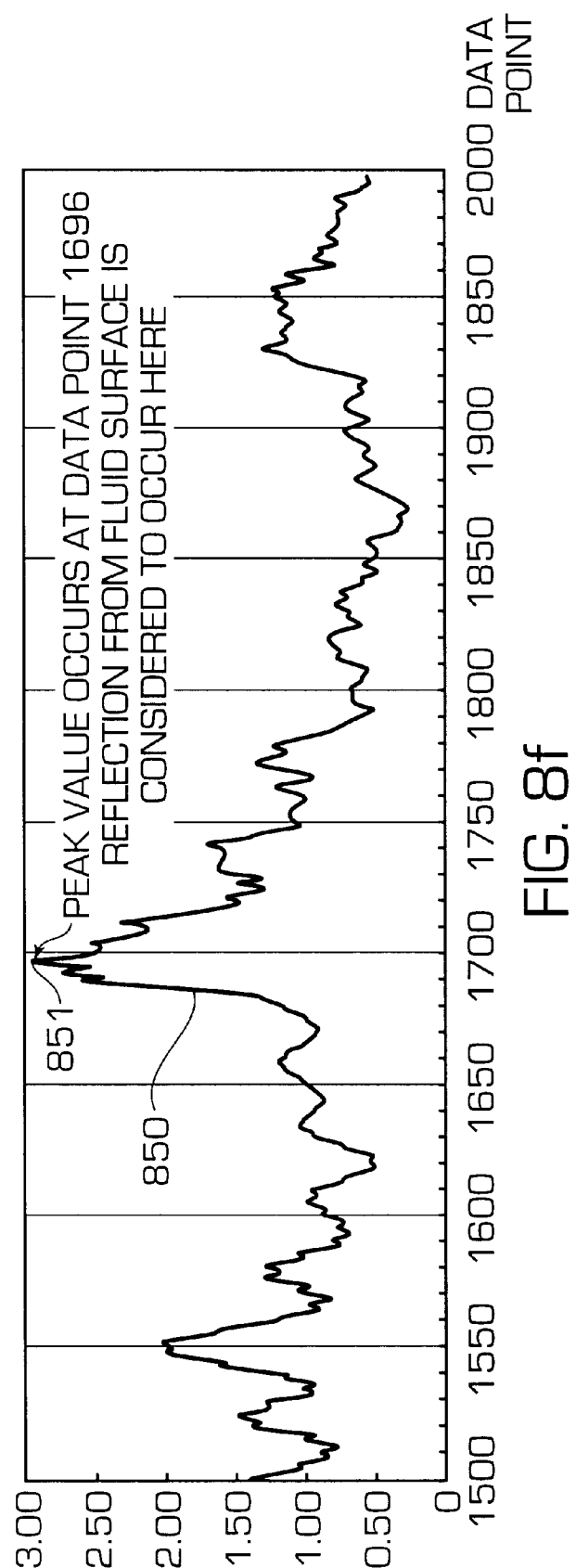
FIG. 8f is a graph of the ratio of the signals shown in FIG. 8d to the signal shown in FIG. 8e where the peak value is considered to be the location of the reflection from the fluid surface.

FIG. 8f shows the ratio 850 of the first low pass filtered signal 830 to the second low pass filtered signal 840. The location of the maximum value 851 of the ratio 850 is considered to be the location of the reflection from the fluid surface 122 in the digital reflection signal array stored at step 504c. In the example shown in FIG. 8f the location of the reflection from the fluid surface is at data point number 1696 of digital reflection signal array stored at step 504c. It should be noted that the above-described technique is not the only one which can be used to determine the location of the maximum value of the ratio signal 850. Other amplitude detection and digital filtering techniques could be used by someone skilled in the art of digital signal processing to find the location of the maximum value of the ratio signal 850.

Figure 9A:
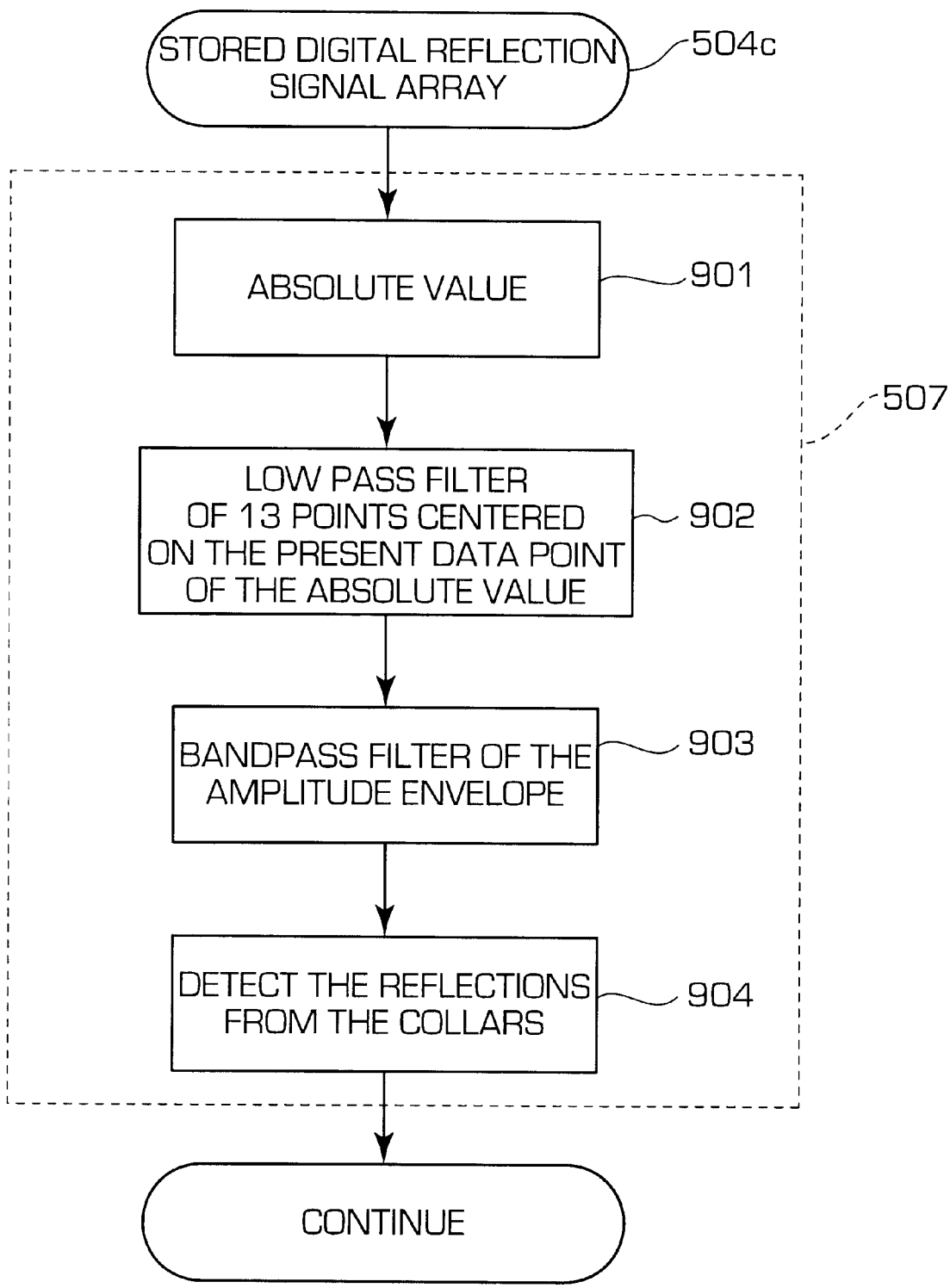
FIG. 9a is a flow chart of the method used to detect reflections from collars in the signal from the microphone.

FIG. 9a is a detailed flow chart of the process used to detect the location of the collars in the digital reflection signal stored at step 504c. When the incident acoustic pulse travels down the annulus of the well, a reflection of the acoustic pulse will occur at each collar. Since the spacing of the collars is generally consistent for the well, and since the speed of sound is relatively constant over the depth of the well, there will be a fundamental frequency of reflections caused by the collars. In practice, except for a few short sections of tubing, the collar spacing in a well will vary by not more than 10% from the average. In practice, the speed of sound changes over the depth of the well and generally increases with depth and may be up to 20% faster at the bottom compared to the top.

In the present invention, detecting reflections from collars requires amplitude demodulation of the digital reflection signal stored at step 504c in which each cycle of the amplitude demodulated signal represents a collar. The process involves calculating the absolute value, at step 901, of the digital reflection signal stored at step 504c, determining the amplitude envelope of the absolute value at step 902, bandpass filtering amplitude envelope at step 903, and detecting the reflections from the collars at step 904. In practice, the bandpass filter step 903 can operate directly on the absolute value obtained at step 901. FIG. 9b is a portion of the digital reflection signal stored at step 504c containing data between the start of the reflection signal and the reflection of the fluid surface containing signals representing reflections of the incident acoustic pulse from the collars. Again, it can be seen that the signal 910 appears to be an underdamped response to the incident acoustic pulse reflecting from the collars 125.

FIG. 9c shows the preferred method of determining the amplitude envelope 902 by calculating the absolute value 920 of the digital reflection signal stored at step 504c.

Figure 9D:
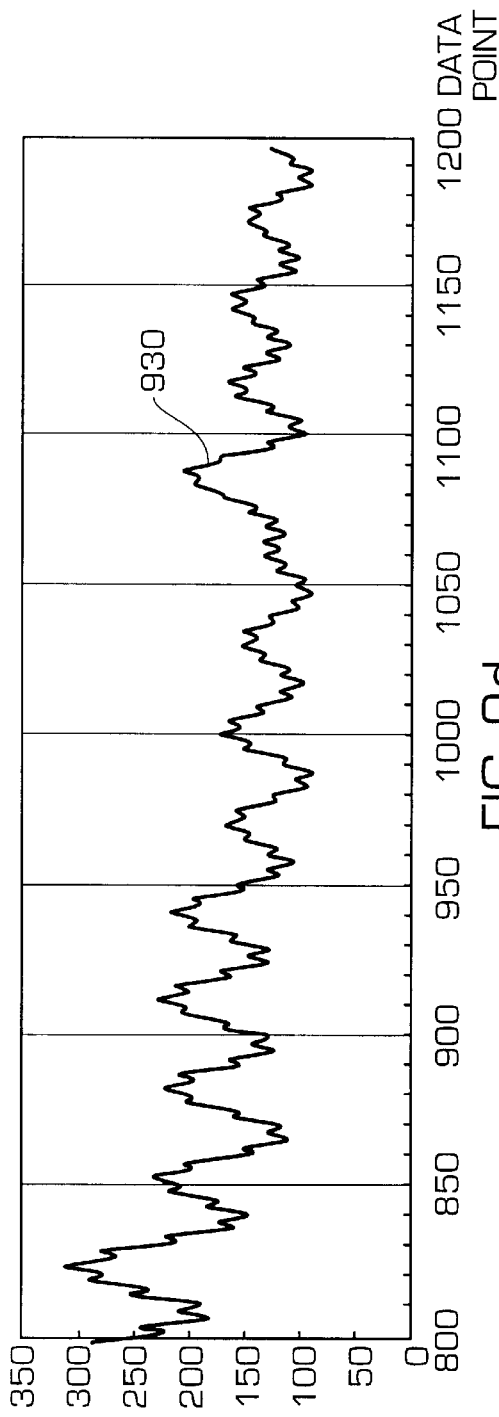
FIG. 9d is a graph of the amplitude envelope shape of the signal shown in FIG. 9b.

FIG. 9d shows the amplitude envelope 930 of the absolute value signal 920. The amplitude envelope 930 results from low pass filtering the absolute value signal. The envelope shape 930 illustrates that the signal available from analyzing the amplitude envelope shape is much more significant than a signal which results from deriving the fundamental collar frequency component from the original stored data 910.

Figure 9E:
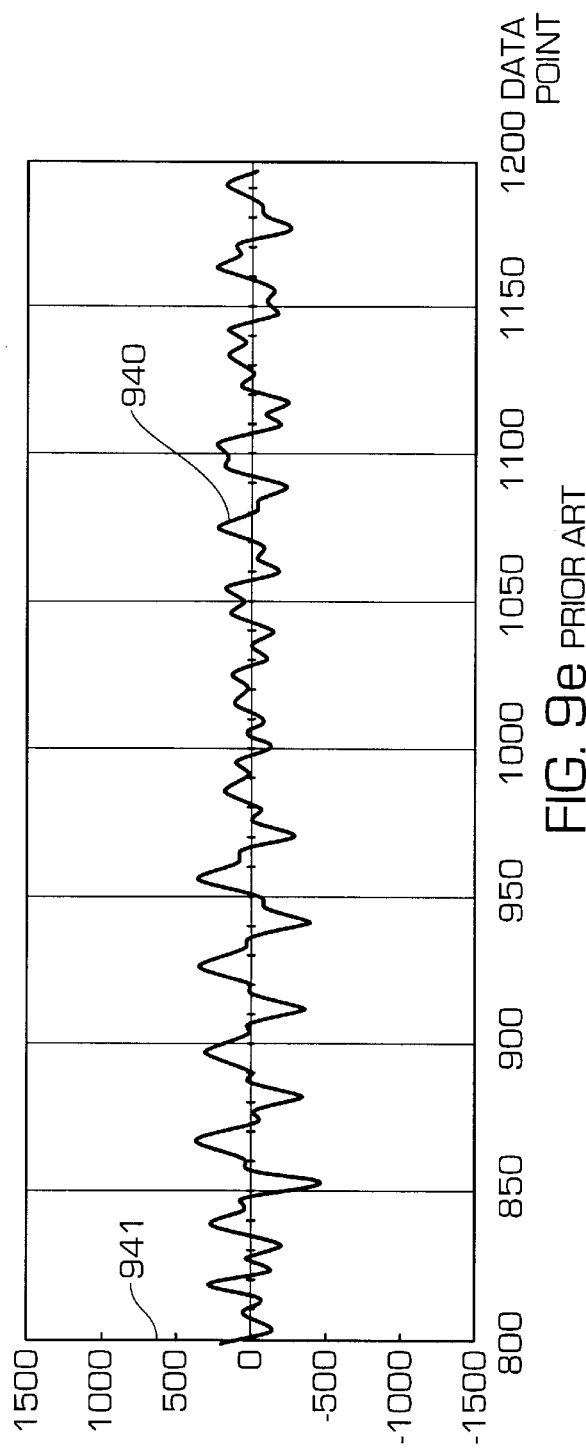
FIG. 9e is a graph of the output of a band pass filter operating on the amplitude envelope shape of the signal shown in FIG. 9d.
Figure 9F:
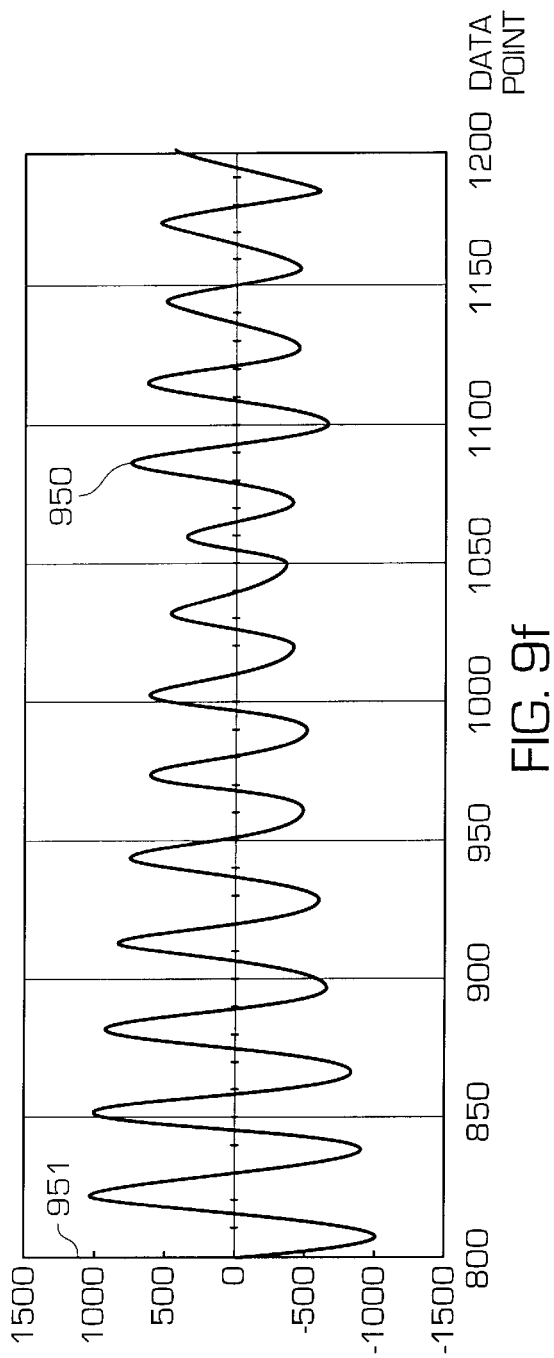
FIGS. 9f–9g is a graph showing the locations of the collars detected by the peaks of the bandpass filtered signal of FIG. 9e.

By referring to FIGS. 9e and 9f, the differences between the analysis method of the present embodiment and that of the prior art can be seen.

FIG. 9e shows the amplitude of the fundamental frequency component 940 of the collar reflections.

FIG. 9f shows the result of applying a bandpass filter to the amplitude envelope signal 930 where the frequency response of the bandpass filter includes the fundamental frequency of the reflections from the collars. Preferably, the bandwidth of the bandpass filter will include the fundamental frequency of the signal reflected from collars and preferably up to two times the fundamental frequency to allow for detection of shorter lengths of tubing. Typically, the average collar spacing is 9.6 meters, so the travel distance for each reflection is 19.2 meters and the nominal speed of sound is 330 meters per second. Therefore the nominal fundamental frequency of the collar reflections will be about 17 hz and the preferred bandwidth of the bandpass filter would be from 15 hz to 35 hz.

By noting that the amplitude scale of FIG. 9e which represents a prior art method of collar detection and the amplitude scale 951 of FIG. 9f are the same, it can be seen that there is a significant difference in signal strength which is an advantage to processing the signals according to the present invention.

Figure 9G:
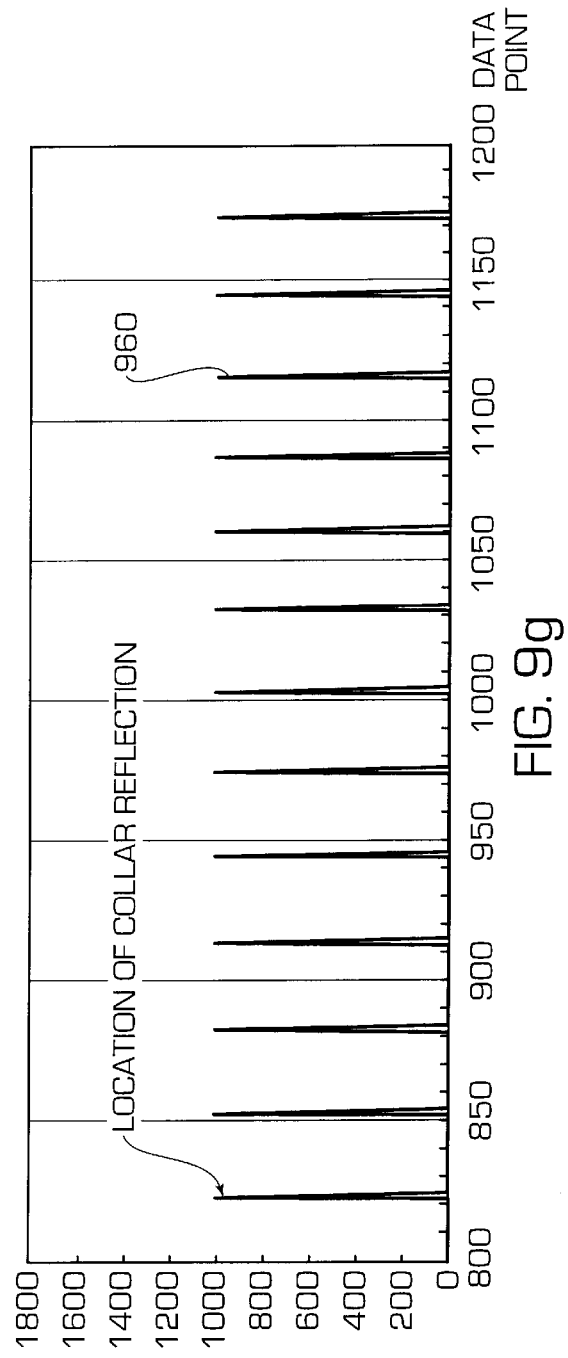

FIG. 9g shows the location of the positive peaks 960 of the bandpass output signal 950 in which each peak represents a reflection from a collar. Since the bandpass filter allows at least the second harmonic of the fundamental frequency of reflections from collars, there can be localized peaks that do not represent actual collar reflections. The preferred method to prevent detecting too many peaks is to look for a peak value within a segment of the data that represents preferably half of the period of a typical collar reflection. In the preferred embodiment, the data sample rate is 500 per second and the nominal collar reflection frequency is 17 hz for nominal tubing lengths of 9.6 meters so there are 29 data points per collar reflection. The preferred segment of data would contain about half of the 29 points or about 15 data points. It is preferred that the number of data points be an odd number and the current data point will be located as the center point with 7 data points prior and 7 data points after the current data point.

Similar results can be obtained by detecting negative peaks, positive zero crossings, or negative zero crossings of the bandpass output signal 950. The preferred method of detecting negative peaks would be to find the most negative value within a segment of data from 7 data points previous to 7 data points after the current data point. False positive-going and false negative-going zero crossings can be reduced by preventing the detection of a second zero crossing within the next 15 data points.

While the above-described amplitude demodulation of the preferred embodiment relates to calculating the absolute value 920 of the digital reflection signal stored at step 504c, other amplitude demodulation techniques could be used. For example, instead of calculating the absolute value 920 of the digital reflection signal, the rms values of the digital reflection signal could be calculated. This could be done, for example, by calculating the square root of a rolling average of the squares of three or more data points from the stored digital reflection signal.

Figure 10A:
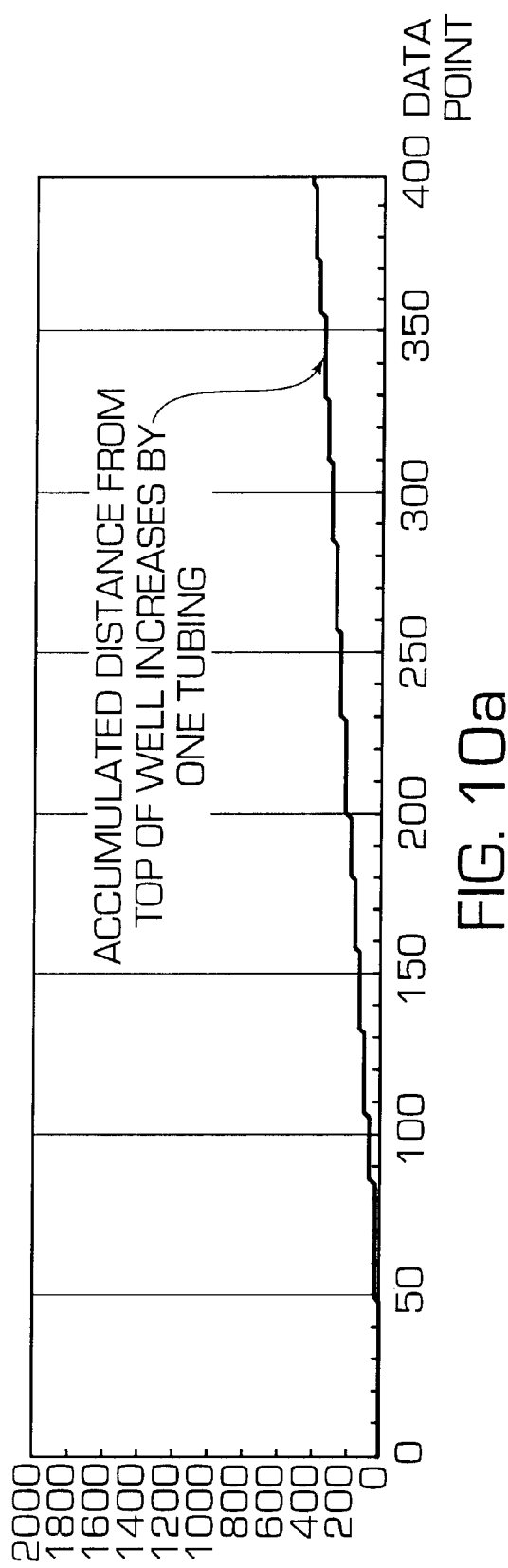
FIG. 10a is a graph showing the accumulation of distance after the detection of collars near the start of the reflection data.
Figure 10B:
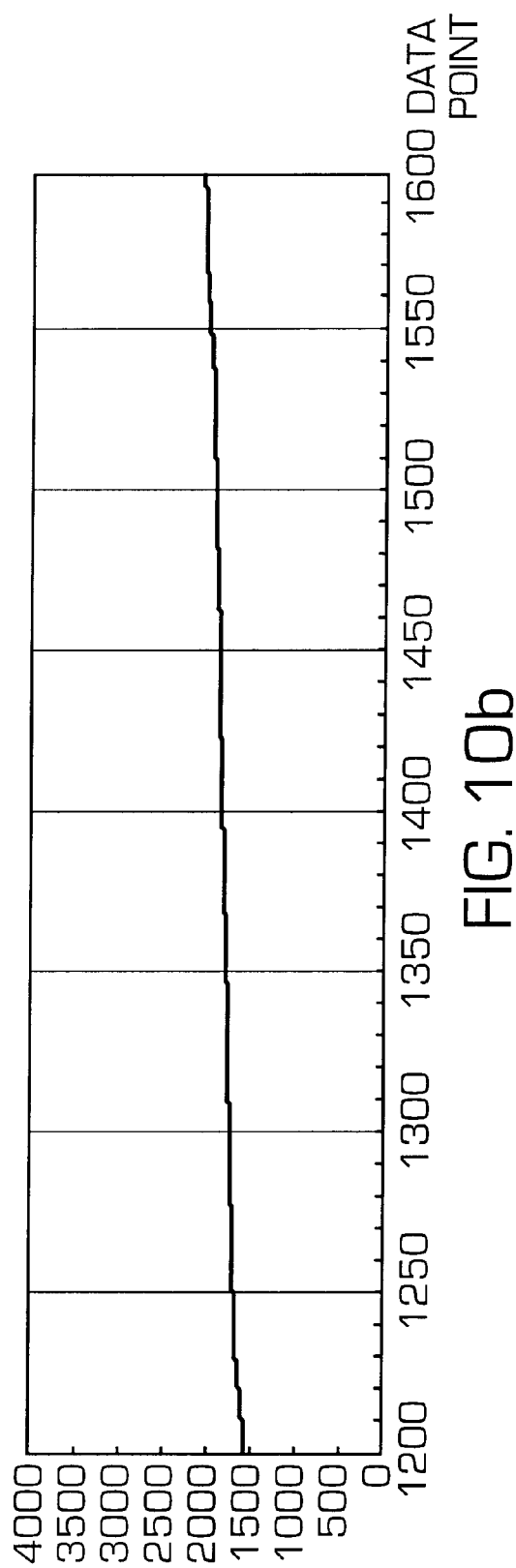
FIG. 10b is a graph showing the accumulation of distance after the detection of collars in the middle of the reflection data.
Figure 10C:
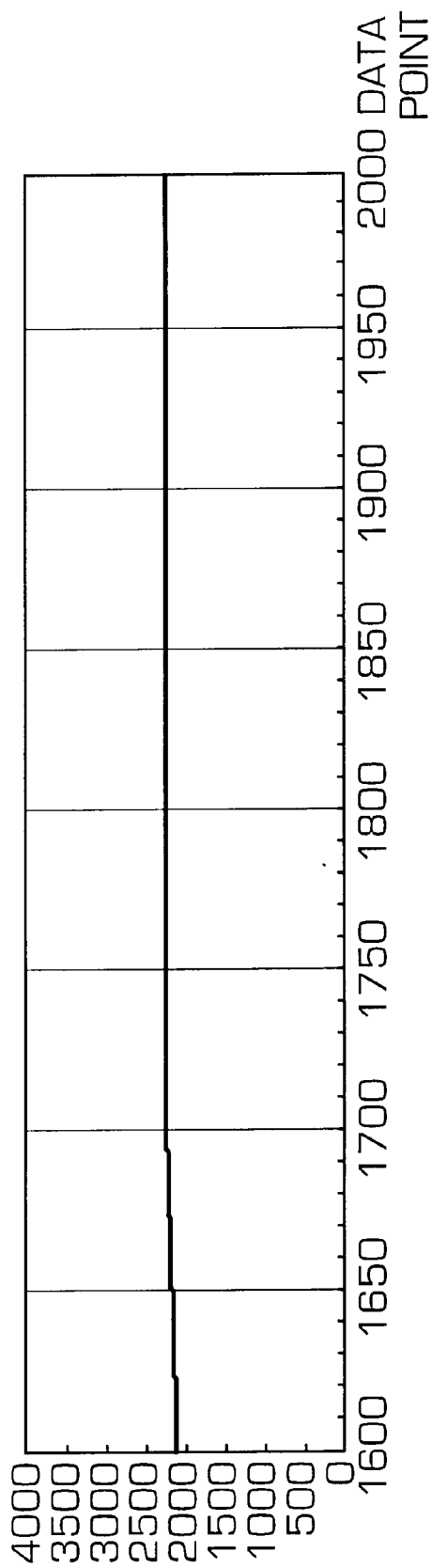
FIG. 10c is a graph showing the accumulation of distance after the detection of collars near the reflection from the fluid surface.

FIGS. 10a, 10b, and 10c show the result of accumulating distance from the start 731 of the reflection signal to the location 851 which represents the reflection from the fluid surface which is fluid depth required by the pump controller. For each point 960 which represents a detected collar, the corresponding length of the tubing section stored at step 501 in the collar spacing table is added to a sum.

In another embodiment, the average collar spacing can be applied to the accumulated distance sum for each collar detection point 960 rather than using a collar spacing table.

An enhancement to provide a finer resolution to the calculation of the depth to the fluid surface that is less than an integer collar spacing involves using the location of the last detected collar and the location of the reflection from the fluid surface within the digital reflection signal array stored at step 504c. For example, the average number of data points between detected collars is divided by the average length of the tubing from the table of tubing lengths 501 to result in an average distance for each data point. If the average collar spacing in the table is 9.63 meters and the average number of data points between detected collars was 30.2 data points, then each data point represents 9.63/30.2=0.319 meters. Therefore, if the reflection from the fluid surface is located 22 data points after the last detected collar, then the accumulated distance is increased by 22*0.319=7.02 meters.

A further enhancement to the present invention is applicable for conditions where the digital reflection signal stored at step 504c contains noise that masks the collar reflections so that some collars are not able to be detected or the noise causes more collars to be detected than are actually present. By using the location of the collars detected within the digital reflection signal array stored at step 504c, the average collar spacing in units of data points can be calculated. The location of the collars is reviewed and if the collar spacing measured in data points is less than 80% of the statistical mode of the collar spacings, then that collar location is suspect and that spacing is removed from the average. If the collar spacing measured in data points is greater than 120% of the statistical mode of the collar spacings, then that collar spacing is removed from the average number of data points per collar. In a similar way, the average tubing length, in units of distance, is calculated from the table of tubing lengths entered at step 501. The table of tubing lengths is reviewed to look for tubing lengths that are less than 80% of the statistical average and if so, that tubing length is removed from the average tubing length calculation. The table of tubing lengths is reviewed to look for tubing lengths that are greater than 120% of the average and if any are found, those tubing lengths are removed from the average tubing length. The fluid depth is calculated by subtracting the location of the start of the reflection data from the location of the reflection from the fluid surface to get the number of data points representing the fluid depth. This is converted to units of distance by dividing number of data points representing the fluid depth by the average collar spacing in units of data points and then multiplying by the average tubing length in units of distance.

The order of the steps used to analyze the amplitude envelope shape can be varied, as long as the amplitude envelope shape, and not the original data, is analyzed.

As set forth above, the present invention analyzes a wide band reflection signal of an acoustic wave to detect a starting point of the wave, a portion of the reflection signal representing the fluid surface and locations in the wave representing collars disposed on the production tubing of a well. The latter analysis is performed by amplitude demodulating the wide band reflection signal. The collar lengths are accumulated to determine the distance to the surface of the fluid. Using knowledge of distance to a pump located in the lower portion of the well, the depth of fluid above the pump can be calculated. The speed of the pump can be controlled to maintain the depth of fluid within a specified range.

For the sake of brevity, the above description of the invention does not include details of certain aspects of the invention which are known to those skilled in the art. For example, no description is provided relating to performing rolling averages, effecting digital filtering, executing analog to digital conversion, and using data memory arrays and utilizing index pointers in an array to reference the location of a data point in the array.

It should be understood that the present invention is not limited to the particular embodiment disclosed herein as the best mode contemplated for carrying out the present invention, except as defined in the appended claims.

What is claimed is:

1. A method of determining the depth to fluid in a well where a downhole pump is attached to a string of production tubing that is connected together with collars and the production tubing is disposed inside a well casing so as to form an annulus between the casing and the production tubing and the annulus is partially filled with fluid to be pumped and the annulus above a fluid surface is filled with gasses, the method comprising:

generating and transmitting an acoustic pulse into the annulus inside the well casing;

detecting reflections of the acoustic pulse from collars on the production tubing and from the fluid surface to obtain a digital reflection signal;

analyzing the digital reflection signal using amplitude demodulation to determine the location of the start of the acoustic pulse within the reflection signal;

analyzing the digital reflection signal using amplitude demodulation to determine the location of the reflection from the fluid surface within the reflection signal;

analyzing the digital reflection signal using amplitude demodulation to detect reflections from collars within the reflection signal; and applying a known distance to each collar reflection detected between the start of the acoustic pulse and the refection from the fluid surface to provide the distance from the top of the well to the fluid surface.

2. A method of determining the depth to fluid in a well as set forth in claim 1, wherein the step of detecting the location of the start of the acoustic pulse comprises the steps of:

generating a magnitude signal from the digital reflection signal by one of the processes of absolute value, squaring, or root-mean-squaring; and filtering the magnitude signal with a low pass filter to obtain an amplitude envelope signal;

wherein the location of the start of the acoustic pulse is considered to be where the amplitude envelope signal is greatest.

3. A method of determining the depth to fluid in a well as set forth in claim 1, wherein the step of detecting the reflection from the fluid surface comprises the steps of:

generating a magnitude signal from the digital reflection signal by one of the processes of absolute value, squaring or root-mean-squaring;

filtering the magnitude signal with a first low pass filter to obtain a first amplitude envelope signal; and filtering the magnitude signal with a second low pass filter with a cutoff frequency that is lower than the cutoff frequency of the first low pass filter to obtain a second amplitude envelope signal;

wherein the location of the reflection from the fluid surface is considered to be where the ratio of the first amplitude envelope signal to the second amplitude envelope signal is greatest.

4. A method of determining the depth to fluid in a well as set forth in claim 3, wherein the first low pass filter is a rolling average of 15 data points ahead of the current data point and the second low pass filter is a rolling average of 100 data points behind the current data point.

5. A method of determining the depth to fluid in a well as set forth in claim 1, wherein the step of detecting the reflections from collars includes the steps of:

generating a magnitude signal from the digital reflection signal by one of the processes of absolute value, squaring, or root-mean-squaring;

filtering the magnitude signal with a low pass filter to obtain a collar reflection amplitude signal; and detecting reflections from collars as the positive peaks of the collar reflection amplitude signal.

6. A method of determining the depth to fluid in a well as set forth in claim 1, wherein the step of detecting a reflection from each collar includes the steps of:

generating a magnitude signal from the digital reflection signal by one of the processes of absolute value, squaring, or root-mean-squaring;

filtering the magnitude signal with a band pass filter to obtain a collar reflection amplitude signal;

detecting reflections from collars using one of the following characteristics of the refection amplitude signal: positive peaks, negative peaks, positive-going zero crossings, and negative-going zero crossings.

7. A method of determining the depth to fluid in a well as set forth in claim 1, wherein the step of applying a known distance to each of the detected collars reflection is accomplished by referencing a table of the known collar spacings and accumulating the distance from the table for each collar detected.

8. A method of determining the depth to fluid in a well as set forth in claim 1, wherein the step of applying a known distance to each of the detected collar reflections is accomplished by applying the average distance between collars to each collar detected and accumulating a distance to the fluid surface.

9. An apparatus for determining the depth to fluid in a well where a downhole pump is attached to a string of production tubing that is connected together with collars and the production tubing is disposed inside a well casing so as to form an annulus between the casing and the production tubing and the annulus is partially filled with fluid to be pumped and the annulus above a fluid surface is filled with gasses, the apparatus comprising:

means for generating and transmitting an acoustic pulse into the annulus inside the well casing;

means for detecting reflections of the acoustic pulse from the collars on the production tubing and from the fluid surface to obtain a digital reflection signal;

means for analyzing the digital reflection signal using amplitude demodulation to determine the location of the start of the acoustic pulse within the reflection signal;

means for analyzing the digital reflection signal using amplitude demodulation to determine the location of the reflection from the fluid surface within the reflection signal;

means for analyzing the digital reflection signal using amplitude demodulation to detect reflections from collars within the reflection signal; and means for applying a known distance to each collar reflection detected between the start of the acoustic pulse and the reflection from the fluid surface to provide the distance from the top of the well to the fluid surface.

10. An apparatus for determining the depth to fluid in a well as set forth in claim 9, wherein the means for analyzing the digital reflection signal using amplitude demodulation to determine the location of the start of the acoustic pulse comprises:

means for generating a magnitude signal from the digital reflection signal by one of the processes of absolute value, squaring, and root mean-squaring;

means for filtering the magnitude signal with a low pass filter to obtain an amplitude envelope signal; and means for locating the start of the acoustic pulse as where the amplitude envelope signal is greatest.

11. An apparatus for determining the depth to fluid in a well as set forth in claim 9, wherein the means for analyzing the digital reflection signal using amplitude demodulation to determine the location of the reflection from the fluid surface within the reflection signal comprises:

means for generating a magnitude signal from the digital reflection signal by one of the process of absolute value, squaring, and root-mean-squaring;

means for filtering the magnitude signal with a first low pass filter to obtain a first amplitude envelope signal;

means for filtering the magnitude signal with a second low pass filter with a cutoff frequency that is lower than the cutoff frequency of the first low pass filter to obtain a second amplitude envelope signal; and means for locating the reflection from the fluid surface as where the ratio of the first amplitude envelope signal to the second amplitude envelope signal is greatest.

12. An apparatus for determining the depth to fluid in a well as set forth in claim 11, wherein the first low pass filter is a rolling average of 15 data points ahead of the current data point and the second low pass filter is a rolling average of 100 data points behind the current data point.

13. An apparatus for determining the depth to fluid in a well as set forth in claim 9, wherein the means for detecting the reflections from collars comprises:

means for generating a magnitude signal from the digital reflection signal by one of the processes of absolute value, squaring, and root-mean-squaring;

means for filtering the magnitude signal with a low pass filter to obtain a collar reflection amplitude signal; and means for detecting reflections from collars as the positive peaks of the collar reflection amplitude signal.

14. An apparatus for determining the depth to fluid in a well as set forth in claim 9, wherein the means for analyzing the digital reflection signal using amplitude demodulation to detect reflections from collars within the reflection signal comprises:

means for generating a magnitude signal from the digital reflection signal by one of the processes of absolute value, squaring, and root-mean-squaring;

means for filtering the magnitude signal with a band pass filter to obtain a collar reflection amplitude signal; and means for detecting reflections from collars as one of the following characteristics of the reflection amplitude signal: the positive peaks, the negative peaks, the positive-going zero crossings, and the negative going zero crossings.

15. An apparatus for determining the depth to fluid in a well as set forth in claim 9, wherein the means for applying a known distance to each collar reflection detected performs a process of referencing a table of the known collar spacings and accumulating the distance from the table for each collar detected.

16. An apparatus for determining the depth to fluid in a well as set forth in claim 9, wherein the means for applying a known distance to each collar reflection detected applies the average distance between collars to each collar detected and accumulates a distance to the fluid surface.

17. A method for controlling the speed of a downhole pump to maximize fluid production from a well where the downhole pump is attached to a string of production tubing that is connected together with collars and the production tubing is disposed inside a well casing so as to form an annulus between the casing and the production tubing and the annulus is partially filled with fluid to be pumped and the annulus above a fluid surface is filled with gasses and the inlet to the pump is to remain below the fluid surface during operation, the method comprising the steps of:

generating and transmitting an acoustic pulse into the annulus inside the well casing;

detecting reflections of the acoustic pulse from the collars on the production tubing and from the fluid surface to obtain a digital reflection signal;

analyzing the digital reflection signal using amplitude demodulation to determine the location of the start of the acoustic pulse within the reflection signal;

analyzing the digital reflection signal using amplitude demodulation to determine the location of the reflection from the fluid surface within the reflection signal;

analyzing the digital reflection signal using amplitude demodulation to detect collar reflections within the reflection signal;

applying a known distance to each of the collar reflections detected between the start of the acoustic pulse and the reflection from the fluid surface to provide the distance from the top of the well to the fluid surface;

increasing the speed of the pump when the fluid surface depth value is less than a first predetermined value; and decreasing the speed of the pump when the fluid surface depth value is greater than a second predetermined value.

18. An apparatus for controlling the speed of a downhole pump to maximize fluid production from a well where the downhole pump is attached to a string of production tubing that is connected together with collars and the production tubing is disposed inside a well casing so as to form an annulus between the casing and the production tubing and the annulus is partially filled with fluid to be pumped and the annulus above a fluid surface is filled with gasses and the inlet to the pump is to remain below the fluid surface during operation, the apparatus comprising:

means for generating and transmitting an acoustic pulse into the annulus inside the well casing;

means for detecting reflections of the acoustic pulse from the collars on the production tubing and from the fluid surface to obtain a digital reflection signal;

means for analyzing the digital reflection signal using amplitude demodulation to determine the location of the start of the acoustic pulse within the reflection signal;

means for analyzing the digital reflection signal using amplitude demodulation to determine the location of the reflection from the fluid surface within the reflection signal;

means for analyzing the digital reflection signal using amplitude demodulation to detect reflections from collars within the reflection signal;

means for applying a known distance to each collar reflection detected between the start of the acoustic pulse and the reflection from the fluid surface to provide the distance from the top of the well to the fluid surface;

means for increasing the speed of the pump when the fluid surface depth value is less than a first predetermined value; and means for decreasing the speed of the pump when the fluid surface depth value is greater than a second predetermined value.

* * * * *